US008121429B2

(12) United States Patent
Kondo et al.

(10) Patent No.: US 8,121,429 B2
(45) Date of Patent: Feb. 21, 2012

(54) IMAGE PROCESSING APPARATUS, IMAGE-CAPTURING APPARATUS, IMAGE PROCESSING METHOD, AND PROGRAM

(75) Inventors: Tetsujiro Kondo, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 12/416,493

(22) Filed: Apr. 1, 2009

(65) Prior Publication Data

US 2009/0262234 A1 Oct. 22, 2009

(30) Foreign Application Priority Data

Apr. 17, 2008 (JP) .................................. 2008-108136

(51) Int. Cl.
*G06K 9/40* (2006.01)

(52) U.S. Cl. ........ 382/254; 382/255; 382/260; 382/269; 382/274; 348/342; 348/345

(58) Field of Classification Search .................. 382/254, 382/255, 260, 263, 264, 269, 274, 275; 358/1.9, 358/3.31, 447, 461, 463, 479; 348/342, 345, 348/335, 606, 624; 355/207.99, 55, 63
See application file for complete search history.

(56) References Cited

U.S. PATENT DOCUMENTS

| | | | |
|---|---|---|---|
| 6,665,096 B1 | 12/2003 | Oh | |
| 6,707,952 B1 | 3/2004 | Tan et al. | |
| 7,945,304 B2 * | 5/2011 | Feinberg | 600/411 |
| 2004/0201753 A1 | 10/2004 | Kondo et al. | |
| 2005/0031179 A1 * | 2/2005 | Wehrli et al. | 382/131 |
| 2005/0078882 A1 * | 4/2005 | Ho et al. | 382/299 |
| 2005/0104970 A1 * | 5/2005 | Shiraki et al. | 348/208.99 |
| 2006/0120621 A1 * | 6/2006 | Larkin et al. | 382/280 |

FOREIGN PATENT DOCUMENTS

| | | |
|---|---|---|
| EP | 1 333 681 | 8/2003 |
| EP | 1 441 508 | 7/2004 |
| JP | 11-266363 | 9/1999 |
| JP | 2001-250119 | 9/2001 |
| JP | 2003-8845 | 1/2003 |
| JP | 2005-63097 | 3/2005 |
| WO | 2004/093330 | 10/2004 |

OTHER PUBLICATIONS

European Search Report dated Sep. 19, 2011; Application No./Patent No. 09156803.0-2202/2111037.

* cited by examiner

*Primary Examiner* — Samir A. Ahmed
*Assistant Examiner* — Ali Bayat
(74) *Attorney, Agent, or Firm* — Oblon, Spivak, McClelland, Maier & Neustadt, L.L.P.

(57) ABSTRACT

An image processing apparatus includes an input unit configured to input a characteristic parameter indicating the characteristics of a filter process; a detection unit configured to detect, on the basis of the characteristic parameter input by the input unit, a phase shift amount between the image-captured signal and an obtained signal; a first forming unit configured to form a first prediction tap composed of a plurality of obtained pixels used to predict a target image-captured pixel value; a coefficient obtaining unit configured to obtain a first prediction coefficient generated in accordance with the characteristic parameter and the phase shift amount in order to predict the target image-captured pixel value by product-sum computation with the value of the first prediction tap; and a first computation unit configured to generate a first output signal corresponding to the image-captured signal by performing product-sum computation between the first prediction coefficient.

13 Claims, 29 Drawing Sheets

FIG. 5
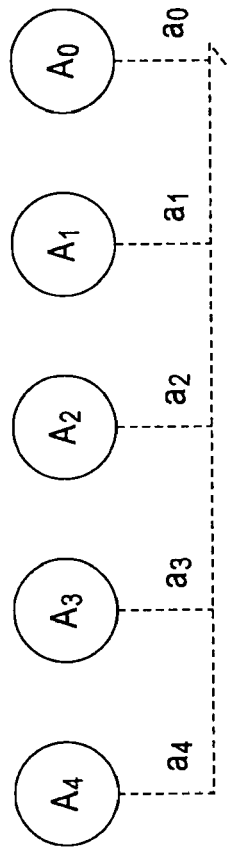
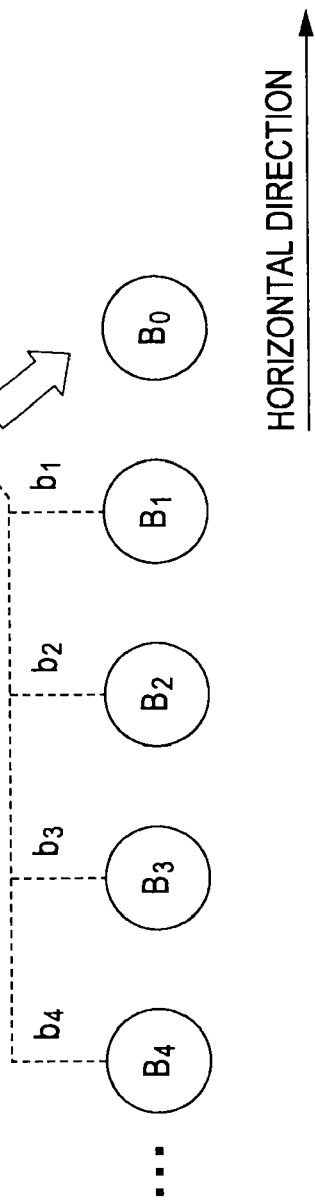
(A) IMAGE-CAPTURED SIGNAL
(B) OBTAINED SIGNAL
HORIZONTAL DIRECTION

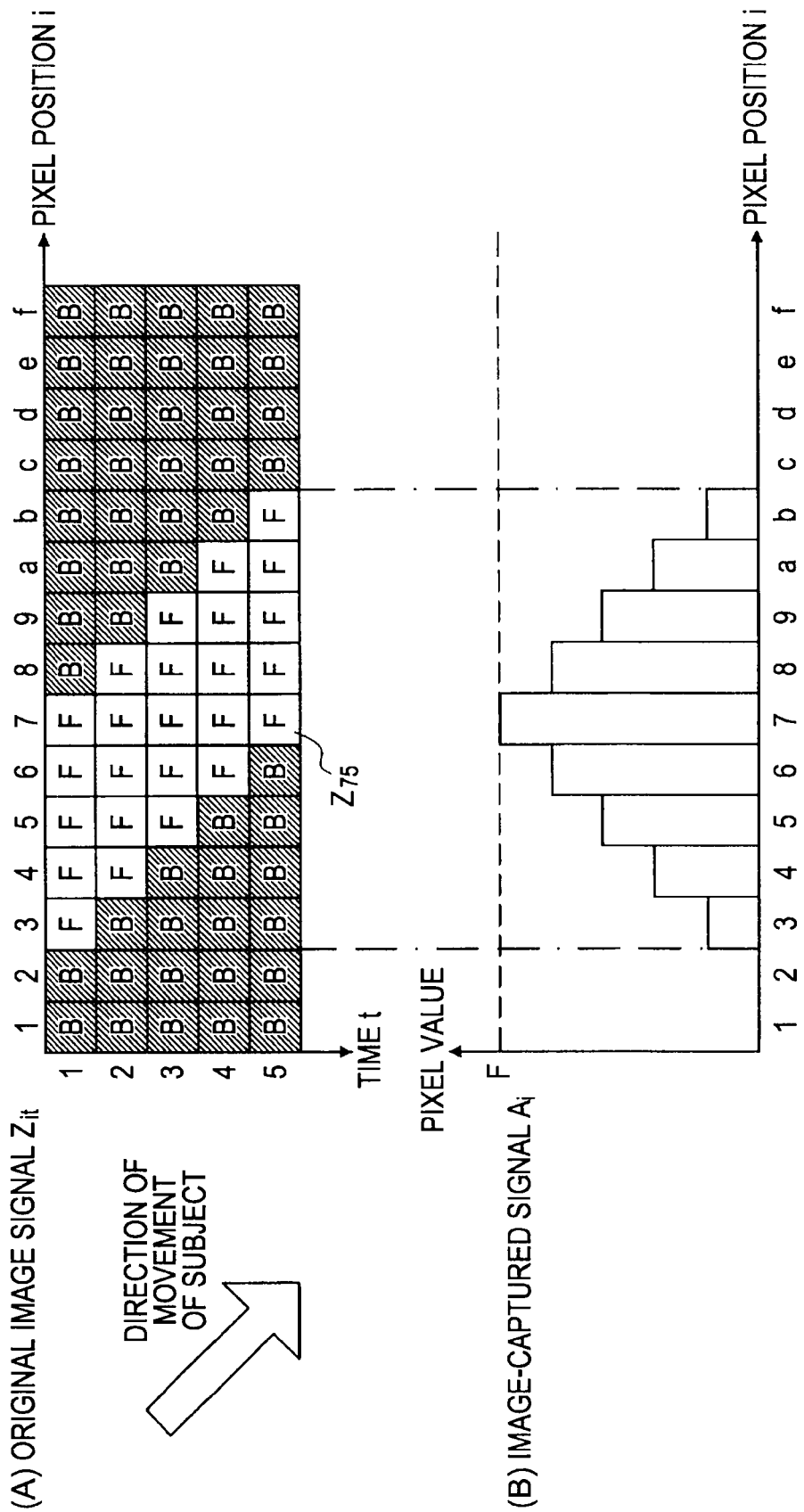

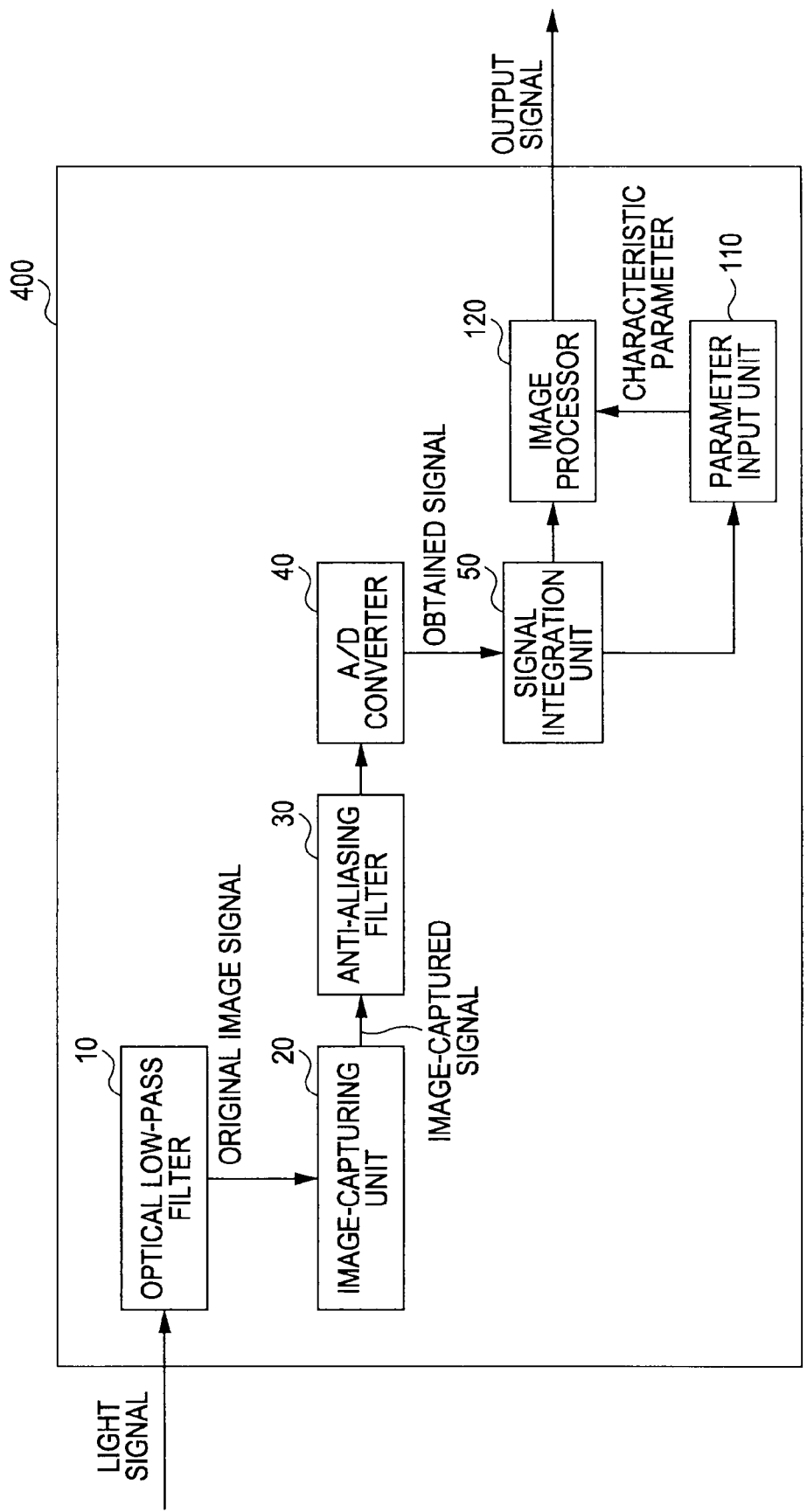

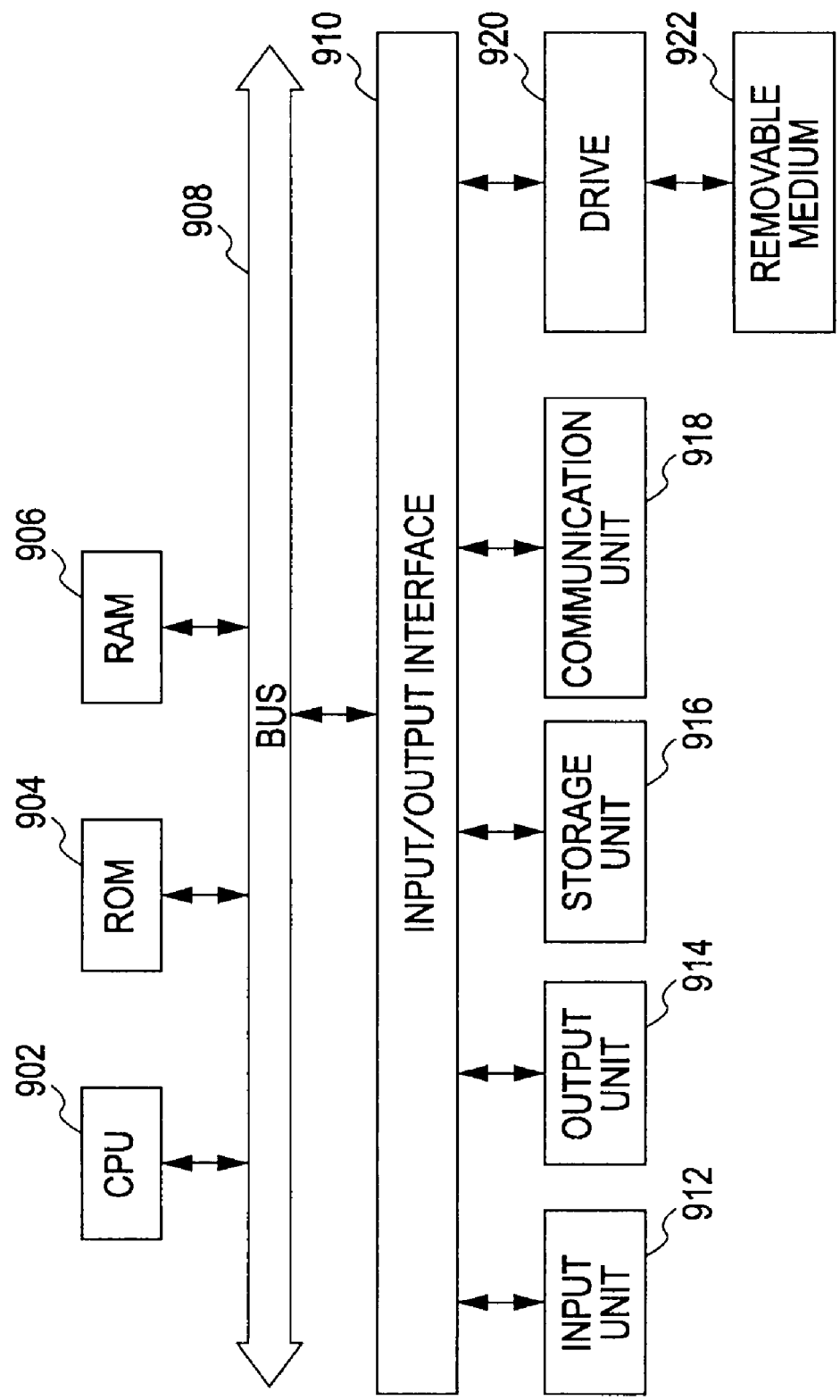

IMAGE PROCESSING APPARATUS, IMAGE-CAPTURING APPARATUS, IMAGE PROCESSING METHOD, AND PROGRAM

BACKGROUND OF THE INVENTION

1. Field of the Invention

The present invention relates to an image processing apparatus, an image-capturing apparatus, an image processing method, and a program.

2. Description of the Related Art

In the related art, various technologies for restoring or correcting, by a digital process, changes of various signals, which occur in a process in which light of the real world is captured to obtain image signals, have been proposed. For example, in Japanese Unexamined Patent Application Publication No. 11-266363 described below, an image processing apparatus minimizing an error during reading by considering individual differences in image reading apparatuses has been disclosed. In Japanese Unexamined Patent Application Publication No. 2003-8845 described below, a technology in which the radiation noise level of an image signal read using a scanner is reduced and image quality is improved has been disclosed.

Furthermore, in Japanese Unexamined Patent Application Publication No. 2001-250119 described below, a signal processing apparatus capable of correcting, for example, motion blur contained in an image signal has been disclosed. In Japanese Unexamined Patent Application Publication No. 2005-63097 described below, an image signal processing apparatus has been disclosed in which blur that occurs due to an auto-focus function of a digital still camera is corrected by considering a model representing the relationship between true values and observed values.

SUMMARY OF THE INVENTION

However, in a case where a digital process is performed on an image signal obtained by capturing light of the real world, when conversion is performed (hereinafter referred to as AD conversion) from an analog signal to a digital signal in a presupposition of processing, there is a case in which distortion occurs in an image signal. For example, as a result of being passed through an anti-aliasing filter that is mounted in many image-capturing apparatuses for the purpose of cutting off folding noise involved in sampling in AD conversion, it is known that distortion called ringing occurs in the surroundings of a boundary portion of an image.

Such distortion of an image signal exerts an influence upon a model used by a digital process for obtaining an image closer to a real world. That is, when a model defined in conformance with the situation of the real world is applied to an image signal after AD conversion, the above-described distortion of the image signal becomes an error with regard to the model, and thus a state in which expected effects of the digital process are not obtained can occur.

It is desirable to provide a novel and improved image processing apparatus capable of removing distortion of an image, which occurs as a result of a filter process when a digital signal is obtained, an image-capturing apparatus for use therewith, an image processing method for use therewith, and a program for use therewith.

According to an embodiment of the present invention, there is provided an image processing apparatus including: input means for inputting a characteristic parameter indicating the characteristics of a filter process performed on an image-captured signal that is generated by capturing light of a real world; detection means for detecting, on the basis of the characteristic parameter input by the input means, a phase shift amount between the image-captured signal and an obtained signal obtained as a result of a filter process performed on the image-captured signal; first forming means for forming a first prediction tap composed of a plurality of obtained pixels used to predict a target image-captured pixel value among the image-captured signals on the basis of the obtained signal that has been phase-shifted using the phase shift amount detected by the detection means; coefficient obtaining means for obtaining a first prediction coefficient generated in accordance with the characteristic parameter and the phase shift amount in order to predict the target image-captured pixel value by product-sum computation with the value of the first prediction tap; and first computation means for generating a first output signal corresponding to the image-captured signal by performing product-sum computation between the first prediction coefficient obtained by the coefficient obtaining means and the value of the first prediction tap output from the first forming means.

With such a configuration, the input means inputs a characteristic parameter indicating characteristics of a filter process performed on an image-captured signal generated by capturing light of the real world. The detection means detects, on the basis of the input characteristic parameter, the amount of phase shift between the image-captured signal and the obtained signal obtained as a result of a filter process performed on the image-captured signal. Then, the first forming means forms a first prediction tap composed of a plurality of obtained pixels used to predict the target image-captured pixel value among the image-captured signals from the obtained signal that has been phase-shifted by using the detected phase shift. Furthermore, in order to predict the target image-captured pixel value by product-sum computation with the value of the first prediction tap, the coefficient obtaining means obtains a first prediction coefficient generated on the basis of the characteristic parameter and the phase shift amount. Then, the first computation means generates a first output signal corresponding to the image-captured signal as a result of product-sum computation between the obtained first prediction coefficient and the obtained value of the first prediction tap.

In the image processing apparatus, the image-captured signal may be a signal generated by an integration effect on the original image signal obtained from light of the real world. The image processing apparatus may further include second forming means for forming a second prediction tap composed of a plurality of image-capturing pixels used to predict a target original pixel value among the original image signals on the basis of the first output signal corresponding to the image-captured signal; and second computation means for generating a second output signal corresponding to the original image signal by performing product-sum computation between the second prediction coefficient generated on the basis of a model of an integration effect when the image-captured signal is generated and the value of the second prediction tap output from the second forming means in order to predict the target original pixel value by product-sum computation with the value of the second prediction tap.

The coefficient obtaining means may be coefficient generation means for calculating the first prediction coefficient on the basis of the a relation expression between the image-captured signal generated on the basis of the characteristic parameter and the obtained signal and on the basis of a constraint condition expression that has been generated on the basis of the nature of neighborhood correlation of an image.

The input means may obtain the characteristic parameter contained in a header of the obtained signal.

The detection means may obtain and detect the phase shift amount from a table in which the characteristic parameters and the phase shift amounts are stored in such a manner as to be associated with each other.

The coefficient obtaining means may be coefficient generation means for calculating an obtained sample signal corresponding to an obtained signal for the image-captured sample signal on the basis of the image-captured sample signal that is stored in advance and the characteristic parameter, and for calculating the first prediction coefficient from an expression generated by using the image-captured sample signal and the calculated obtained sample signal.

The input means may obtain the characteristic parameter in response to an operation of a user via an input device.

The detection means may calculate an obtained sample signal corresponding to the obtained signal for the image-captured sample signal on the basis of the image-captured sample signal that is stored in advance and the characteristic parameter, and may detect, as the phase shift amount, the number of shifted pixels corresponding to the shifted signal in which the difference with the image-captured sample signal is minimized among the plurality of shifted signals in which the obtained sample signal has been shifted by an amount corresponding to a predetermined number of pixels.

According to another embodiment of the present invention, there is provided an image-capturing apparatus including: image-capturing means for capturing light of a real world and generating an image-captured signal; input means for inputting a characteristic parameter indicating the characteristics of a filter process performed on the image-captured signal generated by the image-capturing means; detection means for detecting, on the basis of the characteristic parameter input by the input means, a phase shift amount between the image-captured signal and an obtained signal obtained as a result of a filter process performed on the image-captured signal; first forming means for forming a first prediction tap composed of a plurality of obtained pixels used to predict a target image-captured pixel value among the image-captured signals on the basis of the obtained signal that has been phase-shifted using the phase shift amount detected by the detection means; coefficient obtaining means for obtaining a first prediction coefficient generated in accordance with the characteristic parameter and the phase shift amount in order to predict the target image-captured pixel value by product-sum computation with the value of the first prediction tap; and first computation means for generating a first output signal corresponding to the image-captured signal by performing product-sum computation between the first prediction coefficient obtained by the coefficient obtaining means and the value of the first prediction tap output from the first forming means.

According to another embodiment of the present invention, there is provided an image processing method including the steps of: inputting a characteristic parameter indicating the characteristics of a filter process performed on an image-captured signal that is generated by capturing light of a real world; detecting, on the basis of the input characteristic parameter, a phase shift amount between the image-captured signal and an obtained signal obtained as a result of a filter process performed on the image-captured signal; forming a first prediction tap composed of a plurality of obtained pixels used to predict a target image-captured pixel value among the image-captured signals on the basis of the obtained signal that has been phase-shifted using the detected phase shift amount; obtaining a first prediction coefficient generated in accordance with the characteristic parameter and the phase shift amount in order to predict the target image-captured pixel value by product-sum computation with the value of the first prediction tap; and generating a first output signal corresponding to the image-captured signal by performing product-sum computation between the first obtained prediction coefficient and the value of the first prediction tap.

According to another embodiment of the present invention, there is provided a program for causing a computer that controls an image processing apparatus to function as: input means for inputting a characteristic parameter indicating the characteristics of a filter process performed on an image-captured signal that is generated by capturing light of a real world; detection means for detecting, on the basis of the characteristic parameter input by the input means, a phase shift amount between the image-captured signal and an obtained signal obtained as a result of a filter process performed on the image-captured signal; first forming means for forming a first prediction tap composed of a plurality of obtained pixels used to predict a target image-captured pixel value among the image-captured signals on the basis of the obtained signal that has been phase-shifted using the phase shift amount detected by the detection means; coefficient obtaining means for obtaining a first prediction coefficient generated in accordance with the characteristic parameter and the phase shift amount in order to predict the target image-captured pixel value by product-sum computation with the value of the first prediction tap; and first computation means for generating a first output signal corresponding to the image-captured signal by performing product-sum computation between the first prediction coefficient obtained by the coefficient obtaining means and the value of the first prediction tap output from the first forming means.

As described in the foregoing, according to the image processing apparatus, the image-capturing apparatus, the image processing method, and the program in accordance with the embodiments of the present invention, it is possible to remove distortion of an image, which occurs due to a filter process, when a digital signal is obtained.

BRIEF DESCRIPTION OF THE DRAWINGS

FIG. 5 is an illustration of an example of filter computation using an IIR filter;

FIG. 28 is a schematic view showing an integration effect of motion blur;

FIG. 29 is a block diagram showing the configuration of an image-capturing apparatus according to a fourth embodiment of the present invention; and FIG. 30 is a block diagram showing an example of the configuration of a general-purpose computer.

DESCRIPTION OF THE PREFERRED EMBODIMENTS

Figure 1:
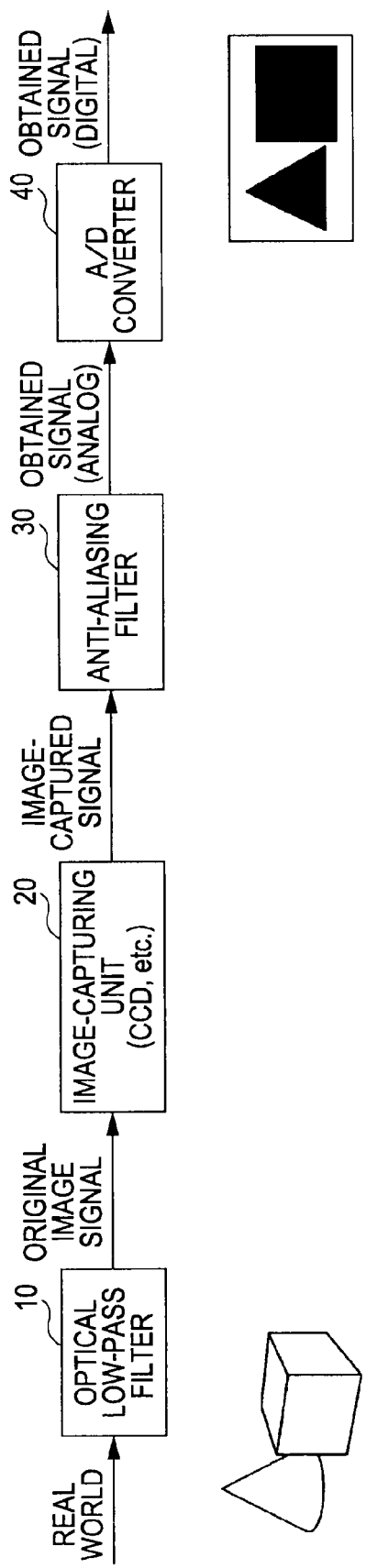
FIG. 1 is a schematic view showing an example of processing until a digital signal obtained by capturing light of the real world.

Preferred embodiments of the present invention will be described below in detail with reference to the attached drawings. In this specification and drawings, components having substantially the same functions are designated with the same reference numerals, and accordingly, duplicated descriptions thereof are omitted.

FIG. 1 is a schematic view showing, as an example, an outline of processing from when light of the real world is captured until a signal converted into digital data is obtained.

Referring to FIG. 1, light from a subject of the real world passes through an optical low-pass filter 10 and is input to an image-capturing unit 20. The image-capturing unit 20 corresponds to, for example, an image sensor, such as a CCD (Charge Coupled Device) or a CMOS (Complementary Metal Oxide Semiconductor). In this specification, a signal that passes through the optical low-pass filter 10 and is input to the image-capturing unit 20 will be referred to as an original image signal.

The original image signal input to the image-capturing unit 20 is, for example, stored as electric charge in the image-capturing unit 20, and is output as an image-captured signal, which is an electrical signal in an analog format. After that, the image-captured signal output from the image-capturing unit 20 is input to an anti-aliasing filter 30. The anti-aliasing filter 30 is a filter used to cut off folding noise involved in sampling during digital conversion. The anti-aliasing filter 30 is typically formed using an analog low-pass filter (low-frequency pass filter).

The analog signal obtained through the anti-aliasing filter 30 is sampled by an AD converter 40 and is thereby converted into a digital signal. In this specification, an image signal that is obtained after passing through the anti-aliasing filter 30 will be referred to as an obtained signal.

Figure 2:
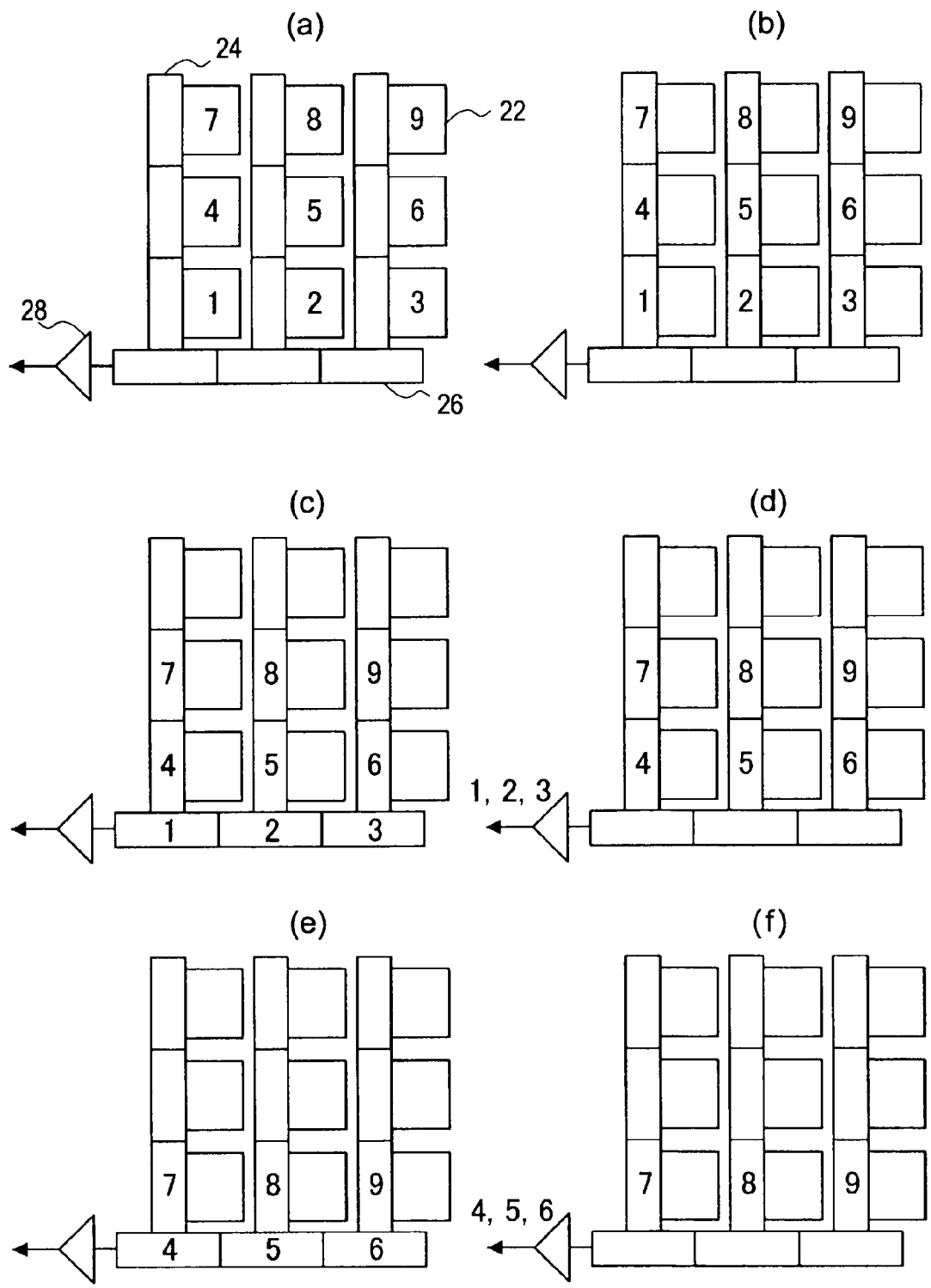
FIG. 2 is a schematic view showing an example of conversion of an original image signal to a one-dimensional image-captured signal.

FIG. 2 is a schematic view showing, as an example of the operation of the image-capturing unit 20, a state in which an original image signal is converted into an image-captured signal and output by a CCD. In FIG. 2, operations of a CCD having nine pixels are shown in such a manner as to be divided into six parts (a) to (f) in a time-series manner.

Referring to part (a) of FIG. 2, the CCD includes nine light-receiving areas 22 arranged in a 3×3 matrix, three vertical transfer units 24 adjacent to individual columns of the light-receiving areas 22, horizontal transfer units 26 connected to the respective vertical transfer units 24, and amplifiers 28 connected to the horizontal transfer units 26.

In such a configuration of the CCD, first, an input original image signal is stored as electric charge in each light-receiving area 22 (part (a) of FIG. 2). Next, the stored electric charge is moved to the vertical transfer unit 24 (part (b) of FIG. 2). Thereafter, the electric charge of the vertical transfer unit 24 is moved toward the horizontal transfer unit 26 on a row-by-row basis (part (c) of FIG. 2). Then, the electric charge inside the horizontal transfer unit 26 is moved in the horizontal direction and is amplified by the amplifier 28 and then output (part (d) of FIG. 2). Next, the electric charge for the next row is moved to the horizontal transfer unit 26 (part (e) of FIG. 2). Then, the electric charge inside the horizontal transfer unit 26 is similarly moved in the horizontal direction and is amplified by the amplifier 28 and then output (part (f) of FIG. 2).

As seen here, in a case where the image-capturing unit 20 is formed using CCDs, a two-dimensional image signal is converted into a one-dimensional electrical signal in a horizontal direction, and after that, the signal is output as an image-captured signal. Furthermore, in a case where the image-capturing unit 20 is formed using, for example, CMOS, a two-dimensional image signal is similarly converted into a one-dimensional electrical signal, and after that, the signal is output.

As described in conjunction with FIG. 1, an image-captured signal, which is a one-dimensional electrical signal output from the image-capturing unit 20, is processed by the anti-aliasing filter 30 before the signal is input to the AD converter 40. At this time, there is a case in which distortion, deterioration or the like of an image occurs in the obtained signal output as a result of a filter process.

Figure 3:
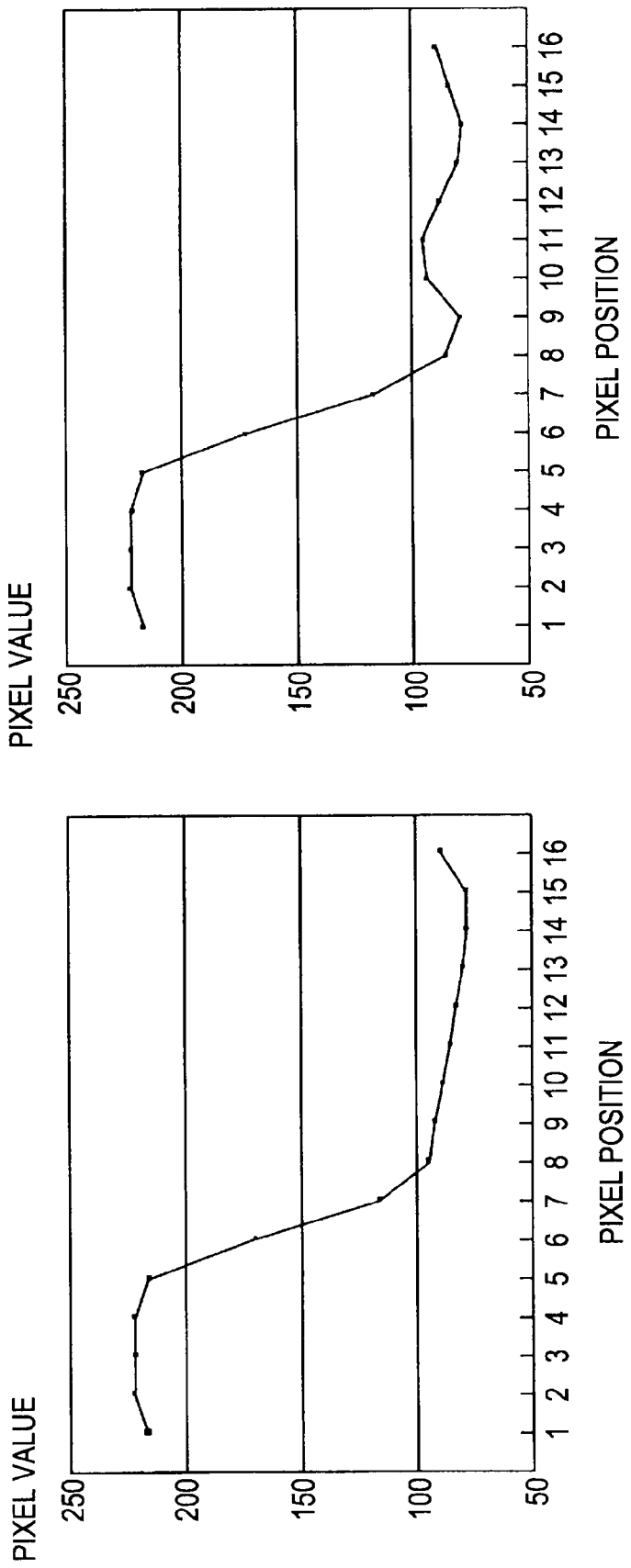
FIGS. 3A and 3B are illustrations showing an example of influences on signals due to an anti-aliasing filter.

FIGS. 3A and 3B are illustrations showing a result in which an example of influences on signals due to an anti-aliasing filter is simulated using an equivalent IIR (Infinite Impulse Response) filter.

FIG. 3A shows an image-captured signal input to the IIR filter. FIG. 3B shows an obtained signal output by the IIR filter. The horizontal axis of FIG. 3A and FIG. 3B shows the pixel position, and the vertical axis thereof shows the pixel value at the pixel position.

Referring to FIG. 3A, a fall edge exists at pixel positions 6 to 8. This area corresponds to, for example, a boundary portion between the background and a subject in the real world. In comparison, referring to FIG. 3B, a mountain portion that does not exist in the image-captured signal exists in the vicinity of pixel positions 10 and 11 spaced by a fixed interval from the fall edge. This is distortion of an image called ringing that occurs as a result of some frequency components being removed by an IIR filter equivalent to an anti-aliasing filter.

When, for example, an obtained signal is expanded and displayed as image data, such distortion and deterioration of an image are visually recognized as large distortion to the user. Furthermore, when a correction process for obtaining an image close to an original image signal, and the like are performed on the obtained signal, in the case that such distortion and deterioration of an image exist, an error occurs on a model for processing, and a state in which it is difficult to obtain expected effects can occur.

Therefore, in first to fourth embodiments described below of the present invention, distortion and deterioration of the image, which are involved with a filter process, are removed.

First Embodiment

Figure 4:
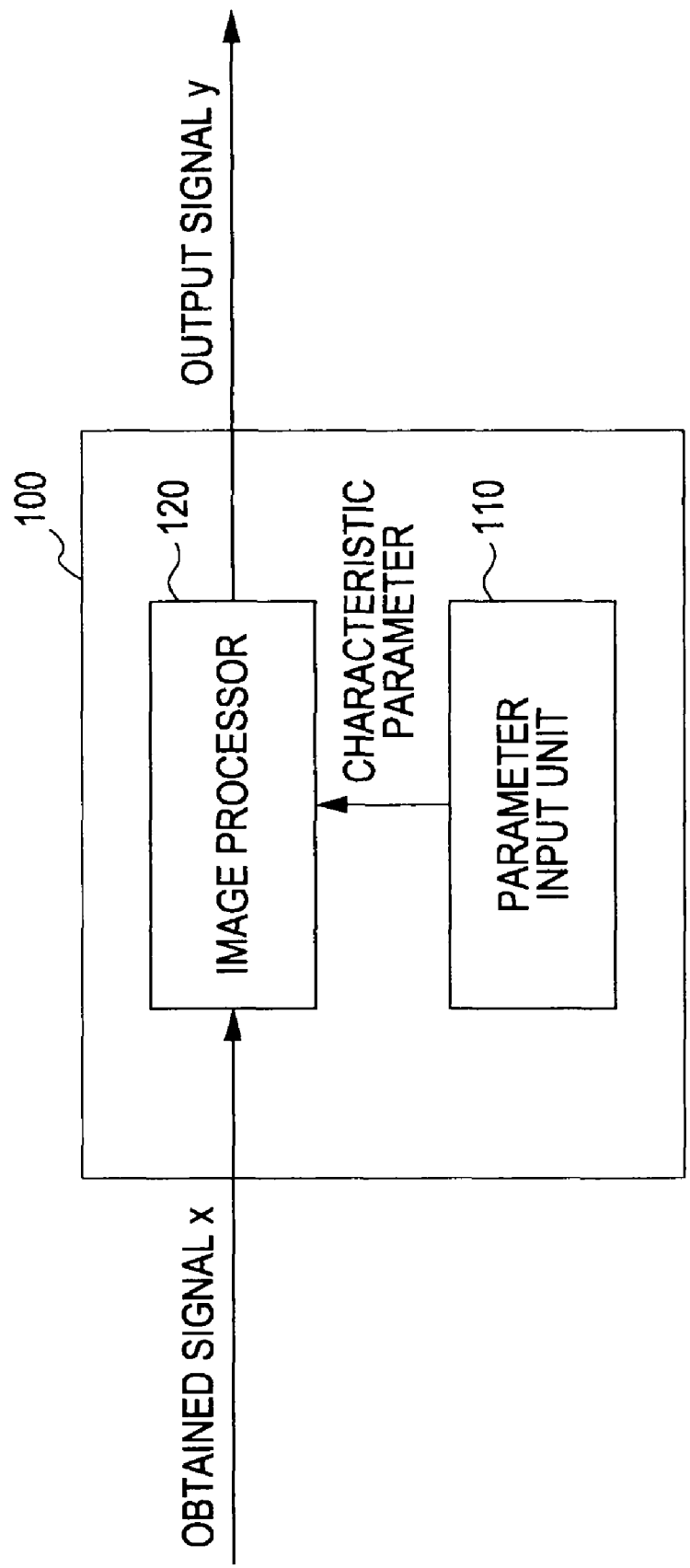
FIG. 4 is a block diagram showing the configuration of an image processing apparatus according to a first embodiment of the present invention.

FIG. 4 is a block diagram showing an outline of the configuration of an image processing apparatus 100 according to a first embodiment of the present invention. Referring to FIG. 4, the image processing apparatus 100 includes a parameter input unit 110 and an image processor 120.

The parameter input unit 110 is connected to the image processor 120 and inputs, to the image processor 120, a characteristic parameter indicating the characteristics of a filter process performed on an image-captured signal generated by capturing light of the real world. For example, as shown in FIG. 1, in a case where an anti-aliasing process is performed on an image-captured signal, a characteristic parameter indicating the characteristics of the anti-aliasing filter is input from the parameter input unit 110 to the image processor 120.

Here, characteristic parameters will be described by using an anti-aliasing filter as an example. Usually, characteristic parameters are uniquely determined according to the types of parts of an image-capturing device, such as a camera.

As described above, an anti-aliasing filter is an analog low-pass filter. For this reason, in a digital process, the characteristics of the anti-aliasing filter can be represented using an IIR filter that accords with the characteristics of a low-pass filter. The characteristics of the IIR filter are represented by Expression (1) described below when an image-captured signal input to a filter is denoted as $A_i$ and an obtained signal output from the filter is denoted as $B_i$.

$$B_0 = \sum_{i=0}^{n} a_i \cdot A_i - \sum_{i=1}^{n} b_i \cdot B_i \quad (1)$$

where n is the order of an IIR filter, $a_i$ is the coefficient multiplied to the image-captured signal $A_i$, and $b_i$ is the coefficient multiplied to the obtained signal $B_i$ that is recurred. In the anti-aliasing filter, such computations are sequentially performed in the horizontal direction, for example, on an image-captured signal output from the amplifier 28 shown in FIG. 2.

For example, if a low-pass filter can be approximated using a Butterworth IIR filter having an order of 4 and a normalized cut-off frequency of 0.5, the coefficient $a_i$ becomes $a_0=0.0940$, $a_1=0.3759$, $a_2=0.5639$, $a_3=0.3759$, and $a_4=0.0940$. The coefficient $b_i$ becomes $b_1=0.0000$, $b_2=0.4860$, $b_3=0.0000$, and $b_4=0.0177$. The normalized cut-off frequency refers to a frequency at which the gain response is $\sqrt{(1/2)}$ when the Nyquist frequency is set to 1.

FIG. 5 schematically shows a state of computations of an IIR filter based on Expression (1) in the case of an order of 4. Circular shapes arranged in the horizontal direction in part (A) of FIG. 5 each represent an image-captured signal $A_i$ input to the filter in a time-series manner. On the other hand, circular shapes arranged in the horizontal direction in part (B) of FIG. 5 each represent an obtained signal $B_i$ output as a result of a computation in the filter. The signals in time series are arranged from left to right in order of increasing newness in the horizontal direction.

Referring to FIG. 5, it is to be understood that the most recently obtained signal $B_0$ is calculated in accordance with Expression (1) by using image-captured signals $A_i$ ($0 \leq i \leq 4$) for past 5 times, including the most recent input signal $A_0$, and obtained signals $B_i$ ($1 \leq i \leq 4$) for past 4 times.

Referring back to FIG. 4, the parameter input unit 110 inputs, to the image processor 120, as characteristic parameters that imitate the characteristics of such a filter, the order n of the IIR filter, the normalized cut-off frequency ω, the coefficient $a_i$ for the image-captured signal, and the coefficient $b_i$ for the obtained signal.

The parameter input unit 110 may be, for example, means for accepting input of characteristic parameters from the user. For example, in a case where the image processing apparatus 100 has an input device including a button, a switch, a keyboard and the like, and a display device, such as a liquid-crystal display panel, choices for determining characteristic parameters may be displayed on the display device, so that the user selects one choice via the input device.

Furthermore, images that are output as a result of the processing by the image processor 120 (to be described later) while, for example, characteristic parameters are changed may be displayed so that the user selects an appropriate image. In such a case, even when the characteristic parameter is not known to the user, it is possible to obtain an image that is processed on the basis of an appropriate characteristic parameter.

Furthermore, in a case where the characteristic parameter is known to the user, the value of the characteristic parameter may be input by the user. Such display of choices or images, and inputs of selection and information by the user can be performed via, for example, an output unit 914 or an input unit 912 (to be described later) in FIG. 30.

Instead of the above, the parameter input unit 110 may obtain, for example, a characteristic parameter recorded in advance in a header area of an input obtained signal and may input the characteristic parameter to the image processor 120. For example, after the obtained signal is converted into a digital signal by the AD converter 40 shown in FIG. 1, a header area including a characteristic parameter can be attached to the obtained signal. In such a case, even if the image processing apparatus 100 itself is not provided with means for accepting input from the user, it is possible for the image processing apparatus 100 to obtain characteristic parameter information. Input of characteristic parameters using a header will be described further in the fourth embodiment (to be described later).

On the other hand, the image processor 120 shown in FIG. 4 receives an obtained signal after AD conversion as an input signal, performs a series of processes described in detail below by using the above-described characteristic parameters and thereafter generates an output signal. The output signal of the image processor 120 in the present embodiment is a digital signal corresponding to an image-captured signal restored by removing distortion of the image by the anti-aliasing filter.

Figure 6:
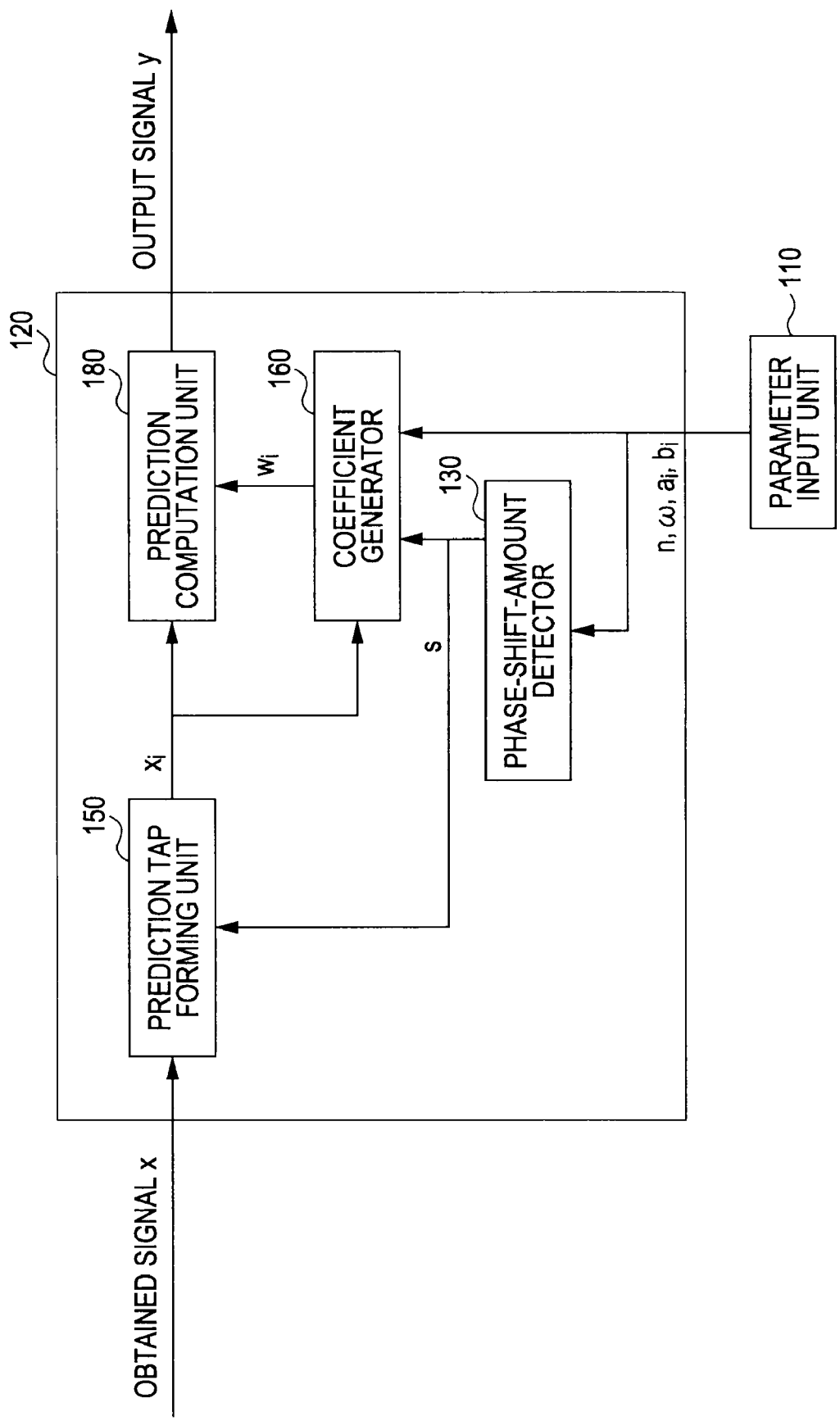
FIG. 6 is a block diagram showing the configuration of an image processor according to the first embodiment of the present invention.

FIG. 6 is a block diagram showing the detailed configuration of the image processor 120 according to the present embodiment. Referring to FIG. 6, the image processor 120 includes a phase-shift-amount detector 130, a prediction tap forming unit 150, a coefficient generator 160, and a prediction computation unit 180.

On the basis of the above-described characteristic parameter input by the parameter input unit 110, the phase-shift-amount detector 130 detects a phase shift amount s between the image-captured signal and the obtained signal obtained as a result of a filter process performed on the image-captured signal and outputs the phase shift amount.

Here, the phase shift means the movement of a series of signals in the time axis. The phase shift amount is such an amount of the movement of the signals. It is known that, for example, when an analog signal is passed through a low-pass filter, in the signal after the filter process, deviation in the time axis occurs in a signal pattern with a signal before the filter process. As described with reference to FIG. 2, the image-captured signal input to the image processor 120 according to the present embodiment is a signal obtained by converting a two-dimensional image signal into a one-dimensional electrical signal and by extracting the signal. For this reason, a phase shift also occurs between the image-captured signal and the obtained signal handled in the present embodiment, and there is a case in which a correct result is not obtained with only the simple computation of signals based on Expression (1). Therefore, in the image processor 120 according to the present embodiment, deviation of a signal due to a filter process performed on the image-captured signal is detected as a phase shift amount, and computations are performed while the signal is corrected by considering the detected phase shift amount.

A description will be given below, with reference to FIGS. 7 to 10, of two exemplary configurations of the phase-shift-amount detector 130.

Figure 7:
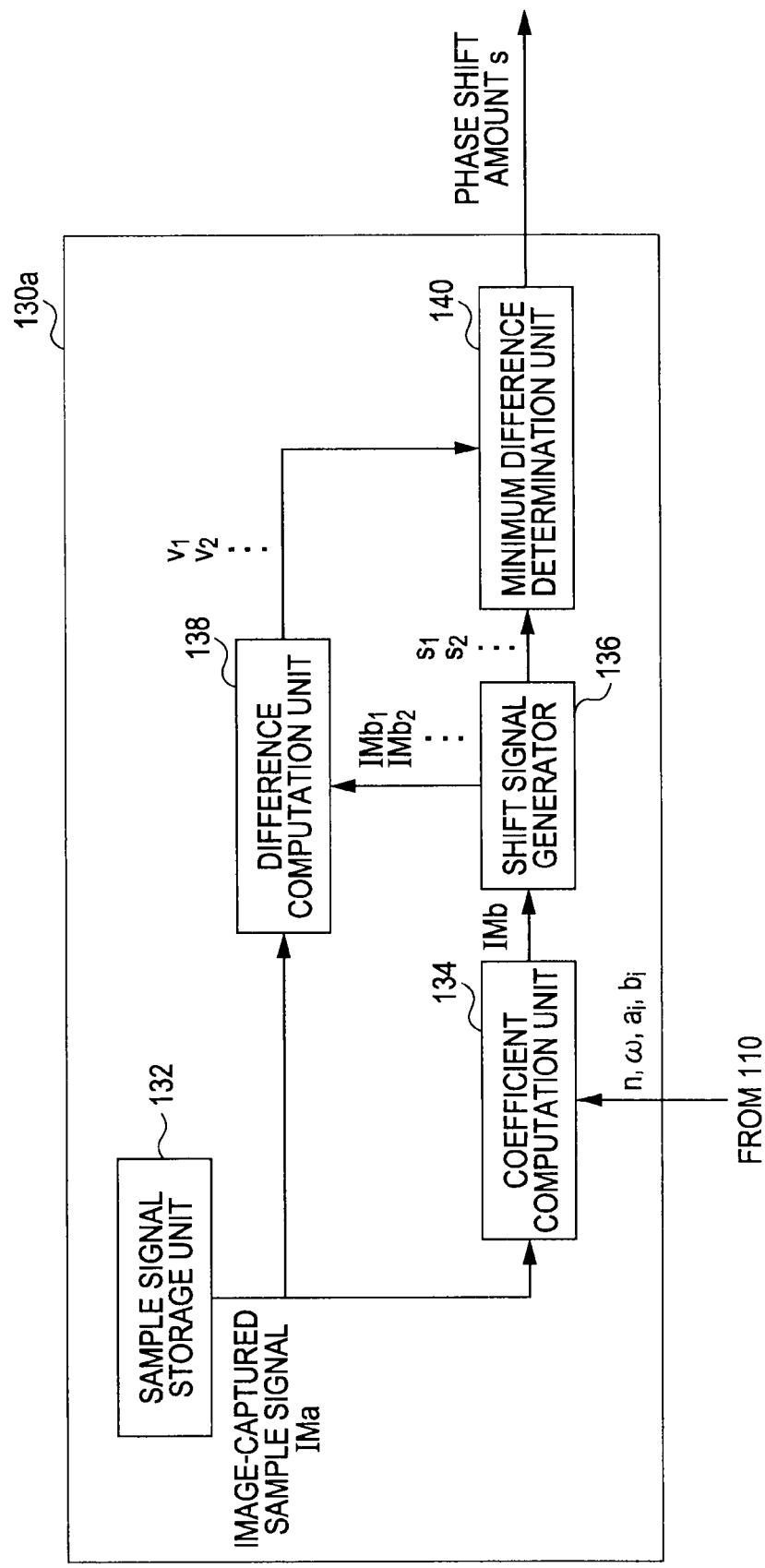
FIG. 7 is a block diagram showing a first exemplary configuration of a phase-shift-amount detector.

FIG. 7 is a block diagram showing the configuration of a phase-shift-amount detector 130a according to a first exemplary configuration. Referring to FIG. 7, the phase-shift-amount detector 130a includes a sample signal storage unit 132, a coefficient computation unit 134, a shift signal generator 136, a difference computation unit 138, and a minimum difference determination unit 140.

The sample signal storage unit 132 is a storage area possessed by the phase-shift-amount detector 130a, and stores an image-captured sample signal IMa, which is a sample value of an arbitrary image-captured signal. When detecting the phase shift amount, the sample signal storage unit 132 outputs the image-captured sample signal IMa to the coefficient computation unit 134 and the difference computation unit 138.

The coefficient computation unit 134 performs the calculation of Expression (1) described above by using a characteristic parameter input from the parameter input unit 110 on the image-captured sample signal IMa obtained from the sample signal storage unit 132, and outputs an obtained sample signal IMb corresponding to the obtained signal with regard to the image-captured sample signal IMa.

The shift signal generator 136 generates, with regard to the obtained sample signal IMb output from the coefficient computation unit 134, a plurality of shifted signals $IMb_d$ (d=1, 2 ...), in which the phase of the obtained sample signal IMb is shifted by an amount corresponding to a predetermined number of pixels. At this point, the predetermined number of pixels can be made to be, for example, in a range of −5 to +5 pixels. In a case where shifted signals are generated in a range of −5 to +5 pixels in the shift signal generator 136, 11 shifted signals $IMb_d$, including a non-shifted signal, are output.

Furthermore, the shift signal generator 136 outputs the shifted signals $IMb_d$ to the difference computation unit 138 and also outputs the number of shifted pixels $s_d$ (d=1, 2 ...) to the minimum difference determination unit 140. At this time, for example, each number of shifted pixels $s_d$ is "2" in a case where two pixels are shifted in a positive direction when the horizontal direction (right direction) in FIG. 5 is assumed to be a positive direction, and is "−2" when two pixels are shifted in a negative direction.

The difference computation unit 138 calculates a difference value between the image-captured sample signal IMa obtained from the sample signal storage unit 132 and each shifted signal $IMb_d$ output from the shift signal generator 136. As the difference value calculated in the difference computation unit 138, for example, the total sum of the difference absolute values of the pixel values with regard to the pixels in a fixed area in the surroundings of the target pixel among the image signals can be used. The difference computation unit 138 outputs the difference value $v_d$ (d=1, 2 ...) calculated with regard to each shifted signal $IMb_d$ in that manner to the minimum difference determination unit 140.

The minimum difference determination unit 140 temporarily stores the number of shifted pixels $s_d$ output from the shift signal generator 136 and the difference value $v_d$ output from the difference computation unit 138 in such a manner as to be associated with each other, and makes a determination as to the minimum value of the difference value $v_d$. Then, the number of shifted pixels $s_d$ corresponding to the difference value $v_d$ that has been determined to be a minimum value is output as the phase shift amount s that has occurred due to the filter process.

Here, the image-captured sample signal IMa has been used in the phase-shift-amount detector 130a, but the image-captured sample signal IMa may not be image data. For example, any one-dimensional data may be used as the image-captured sample signal IMa as long as it is data from which the phase shift amount can be detected.

Figure 8:
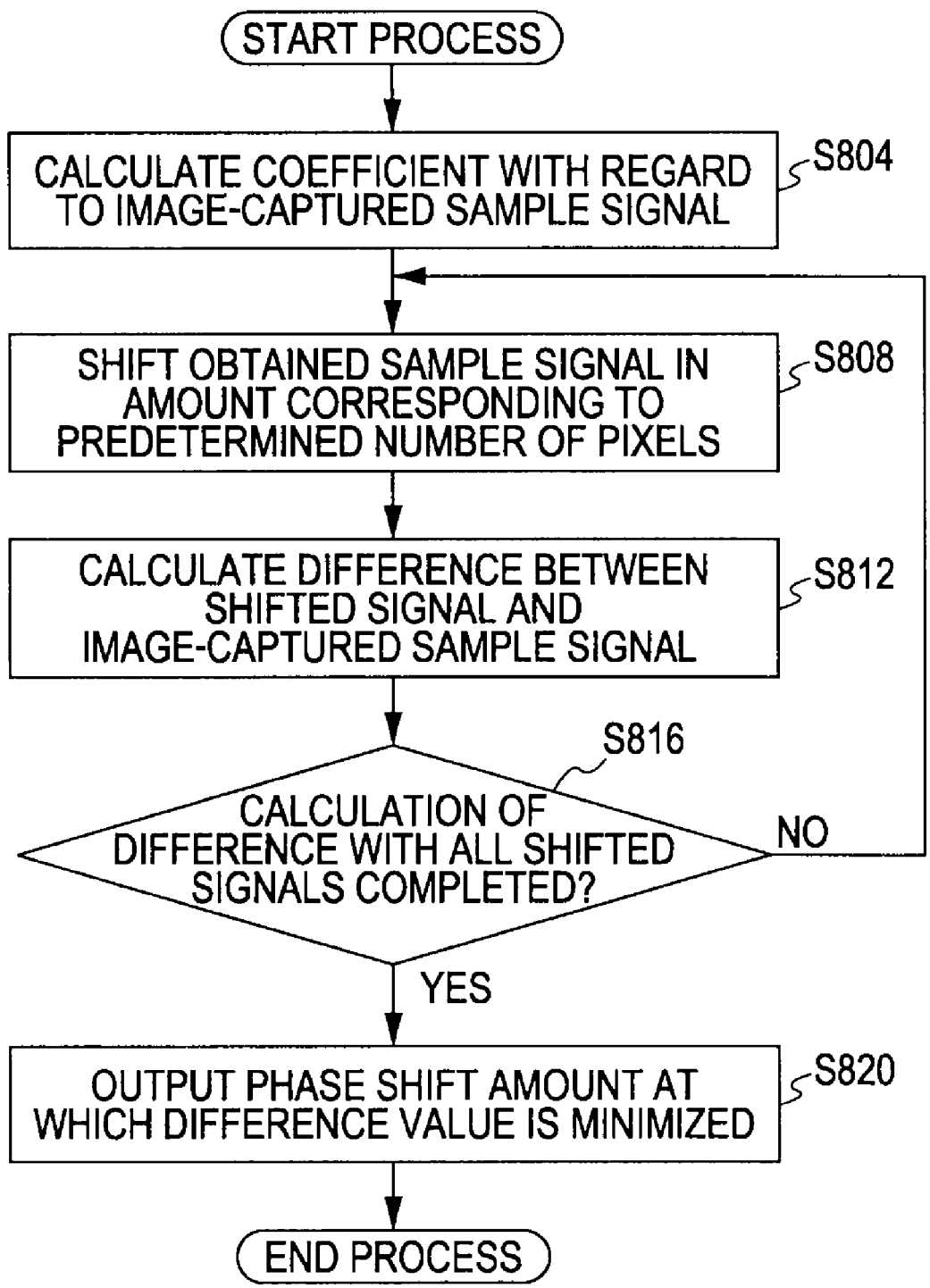
FIG. 8 is a flowchart showing the flow of a phase-shift-amount detection process according to the first exemplary configuration of the phase-shift-amount detector.

FIG. 8 is a flowchart showing the flow of a phase-shift-amount detection process by the phase-shift-amount detector 130a according to a first exemplary configuration.

Referring to FIG. 8, first, the coefficient computation unit 134 performs coefficient computation on the image-captured sample signal IMa obtained from the sample signal storage unit 132 by using the characteristic parameter input from the parameter input unit 110, and outputs an obtained sample signal IMb (S804).

Next, the shift signal generator 136 generates a plurality of shifted signals $IMb_d$, in which the obtained sample signal IMb has been shifted by an amount corresponding to a predetermined number of pixels (S808). At this time, the shifted signals $IMb_d$ are output to the difference computation unit 138 and also the number of shifted pixels $s_d$ is output to the minimum difference determination unit 140.

After that, the difference computation unit 138 sequentially performs a difference calculation with the image-captured sample signal IMa with regard to the shifted signals $IMb_d$, and the difference value $v_d$ corresponding to the shifted signal $IMb_d$ is output to the minimum difference determination unit 140 (S812). At this time, if the difference calculation for all the shifted signals $IMb_d$ has been completed, the process proceeds to S820, and if the shifted signal $IMb_d$ in which the difference calculation has not been completed remains, the process returns to S808, and the processing is repeated (S816).

Then, the minimum difference determination unit 140 detects, as the phase shift amount s, the number of shifted pixels $s_d$ in which the smallest difference value $v_d$ has been obtained, and outputs it (S820).

According to the phase-shift-amount detector 130a in accordance with the first exemplary configuration, it is possible to detect the phase shift amount by using an image-captured sample signal on the basis of the characteristic parameter input from the parameter input unit 110. As a result, by performing a process for predicting an image-captured signal (to be described later) while a phase shift that has occurred due to the filter process performed on the image-captured signal is corrected as appropriate, the accuracy of the prediction is improved.

Figures 9, 10:
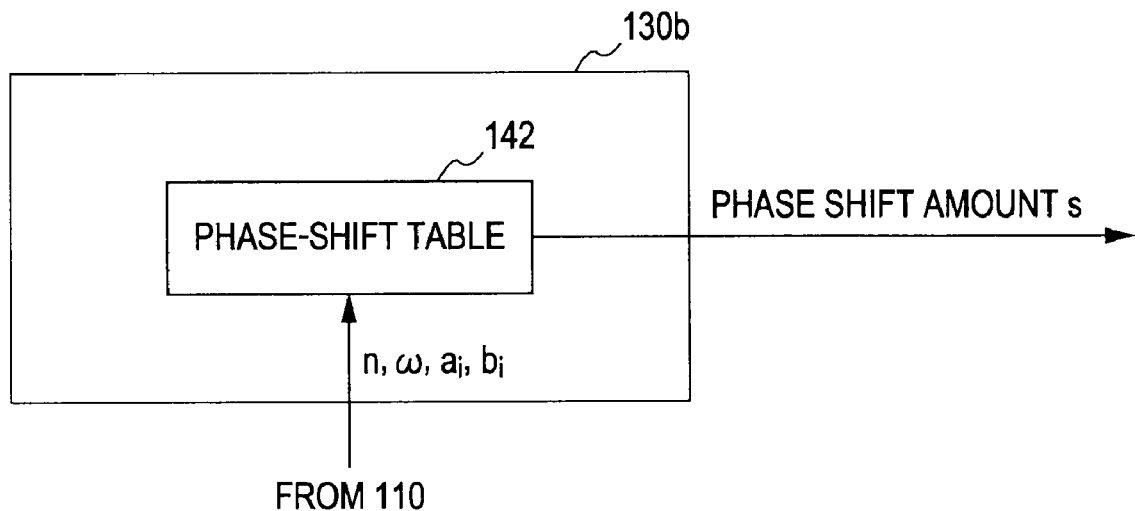
FIG. 9 is a block diagram showing a second exemplary configuration of the phase-shift-amount detector.
FIG. 10 is an illustration showing an example of a phase-shift table.

FIG. 9 is a block diagram showing the configuration of a phase-shift-amount detector 130b according to a second exemplary configuration. Referring to FIG. 9, the phase-shift-amount detector 130b includes a phase-shift table 142.

The phase-shift table 142 is a reference table in which characteristic parameters representing the characteristics of a filter and the phase shift amounts that occur due to each filter are stored in such a manner as to be associated with each other. Usually, the phase shift amount is uniquely determined when a characteristic parameter is determined. Therefore, if candidates of characteristic parameters input from the parameter input unit 110 are already known, it is possible to store, in the phase-shift table 142, characteristic parameters and phase shift amounts corresponding thereto in such a manner as to be associated with each other.

FIG. 10 is an illustration showing the structure of the phase-shift table 142. Referring to FIG. 10, the phase-shift table 142 is formed in a two-dimensional table format in which each column corresponds to the value of the filter order n and each row corresponds to the normalized value of the cut-off frequency ω. In the example of FIG. 10, three values, that is, 4, 5, and 6, are defined as the filter order n, and four values of 0.5 to 0.8 are defined in units of 0.1 as the cut-off frequency ω, and thus 3×4=12 phase shift amounts are stored. The values of the phase shift amounts exemplified here are phase shift amounts produced by filters approximated using a Butterworth IIR filter having each filter order and cut-off frequency.

The phase-shift-amount detector 130b according to the second exemplary configuration shown in FIG. 9 receives an input of characteristic parameters from the parameter input unit 110, refers to the phase-shift table 142 shown in FIG. 10, and obtains and outputs the phase shift amount corresponding to the input characteristic parameter. As a result, it is possible to obtain the phase shift amount without performing computations for detecting a phase shift amount each time a characteristic parameter is input.

The phase-shift-amount detector 130 may be formed by combining the two exemplary configurations described with reference to FIGS. 7 to 10. For example, in a case where the input characteristic parameter is an already known parameter, the phase shift amount may be obtained from the phase-shift table 142 in accordance with the second exemplary configuration. In a case where the input characteristic parameter is not an already known parameter, the phase shift amount may be calculated in accordance with the first exemplary configuration. At this time, by adding the phase shift amount calculated in accordance with the first exemplary configuration to the phase-shift table 142, in the case that the same characteristic parameter is input once more, it is possible to obtain the phase shift amount from the phase-shift table 142 without calculating the phase shift amount again.

Next, referring back to FIG. 6, the description of the configuration of the image processor 120 according to the present embodiment is continued.

The prediction tap forming unit 150 shifts the phase of an obtained signal x by using the phase shift amount s output from the phase-shift-amount detector 130, and extracts and forms a prediction tap $x_i$ composed of a plurality of obtained pixels used to predict the target image-captured pixel value among the image-captured signals. Here, the target image-captured pixel value is assumed to mean the pixel value of the image-captured signal corresponding to the pixel position at which the prediction of the image-captured signal is performed.

Figure 11:
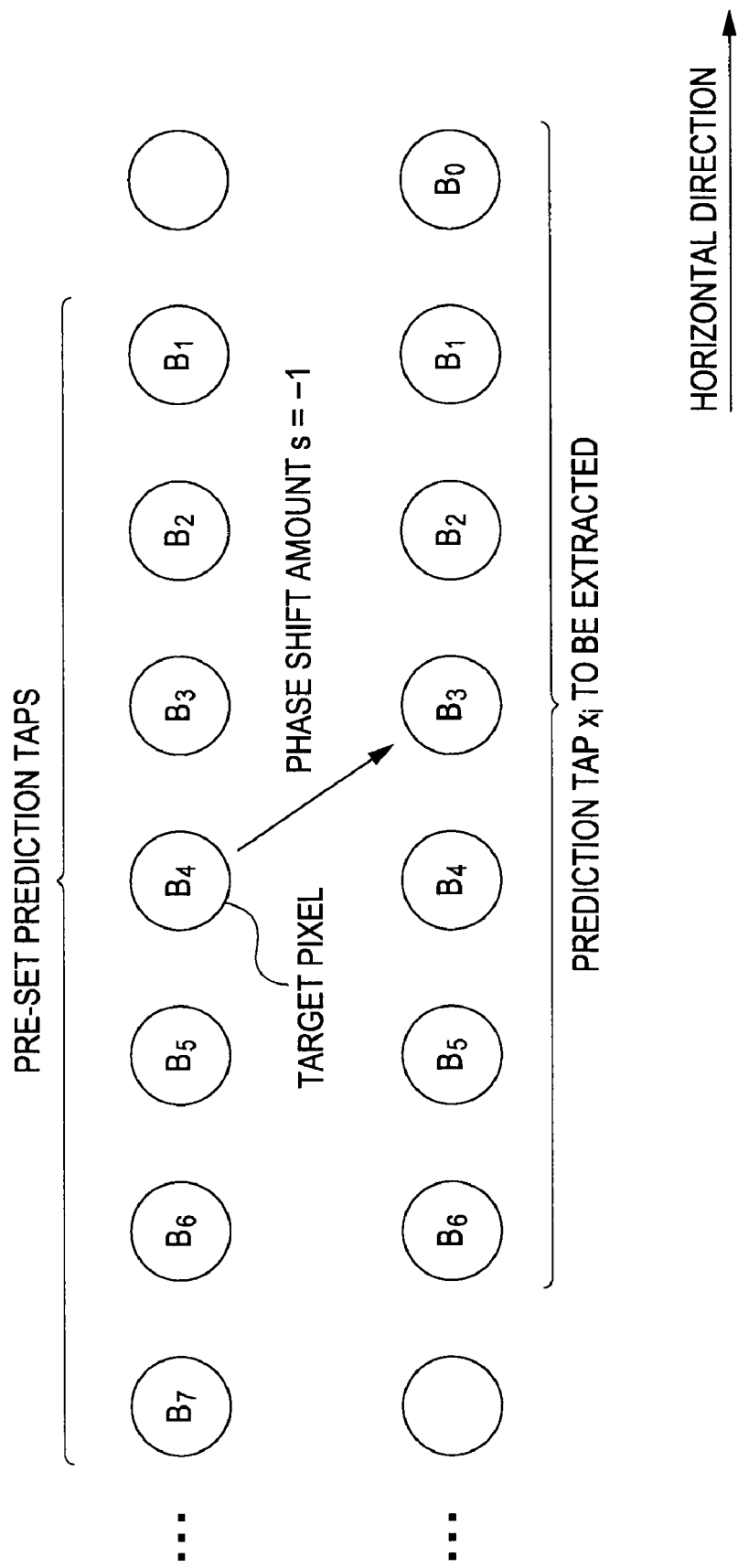
FIG. 11 is an illustration of an example of processing of a prediction tap forming unit according to the first embodiment of the present invention.

FIG. 11 is a schematic view in which the state of processing in the prediction tap forming unit 150 is conceptually depicted. As can be understood from Expression (1) described above, each pixel value of the obtained signal after the filter process is performed has a correlation with the pixel value positioned in the surroundings of the target pixel. Therefore, by using a plurality of pixel values positioned in the surroundings of the target image-capturing pixel, the prediction of the target image-captured pixel value is performed. The prediction tap refers to an arrangement of a plurality of pixel values used to perform such prediction of the target image-captured pixel value.

In the upper part of FIG. 11, as an example of a pre-set prediction tap, seven pixels $B_1$ to $B_7$, among which the target pixel $B_4$ is in the center, are shown. The number of pixels of the prediction tap is typically defined in advance inside the prediction tap forming unit 150. In FIG. 11, the number of pixels of the prediction tap is set to 7. The number of pixels of the prediction tap is not limited to this, and may be any value.

With respect to this pre-set prediction tap, the prediction tap forming unit 150 forms a prediction tap by considering the above-described phase shift. It is assumed that, for example, the phase shift amount s input from the phase-shift-amount detector 130 equals to −1. This means that the image-captured signal output from the image-capturing unit 20 is obtained by being delayed in an amount corresponding to one pixel due to the filter process. Therefore, after the prediction tap forming unit 150 shifts the prediction tap used to predict the target image-captured pixel value ahead by an amount corresponding to one pixel from the pre-set prediction tap, the prediction tap forming unit 150 extracts the prediction tap.

Referring to FIG. 11, in the lower part of the figure, a prediction tap extracted by the prediction tap forming unit 150 is shown. Here, on the basis of the phase shift amount s=−1 input from the phase-shift-amount detector 130, prediction taps $B_0$ to $B_6$ shifted ahead by an amount corresponding to one pixel (in the right direction in the figure) from the pre-set prediction taps $B_1$ to $B_7$ are extracted.

Referring back to FIG. 6 again, the description of the configuration of the image processor 120 according to the present embodiment is continued.

On the basis of the characteristic parameter and the phase shift amount s, the coefficient generator 160 generates and obtains a prediction coefficient $w_i$ used to predict the target image-captured pixel value by product-sum computation with the prediction tap $x_i$ output from the prediction tap forming unit 150.

A description will be given below, with reference to FIGS. 12 to 15, of two exemplary configurations of the coefficient generator 160.

Figure 12:
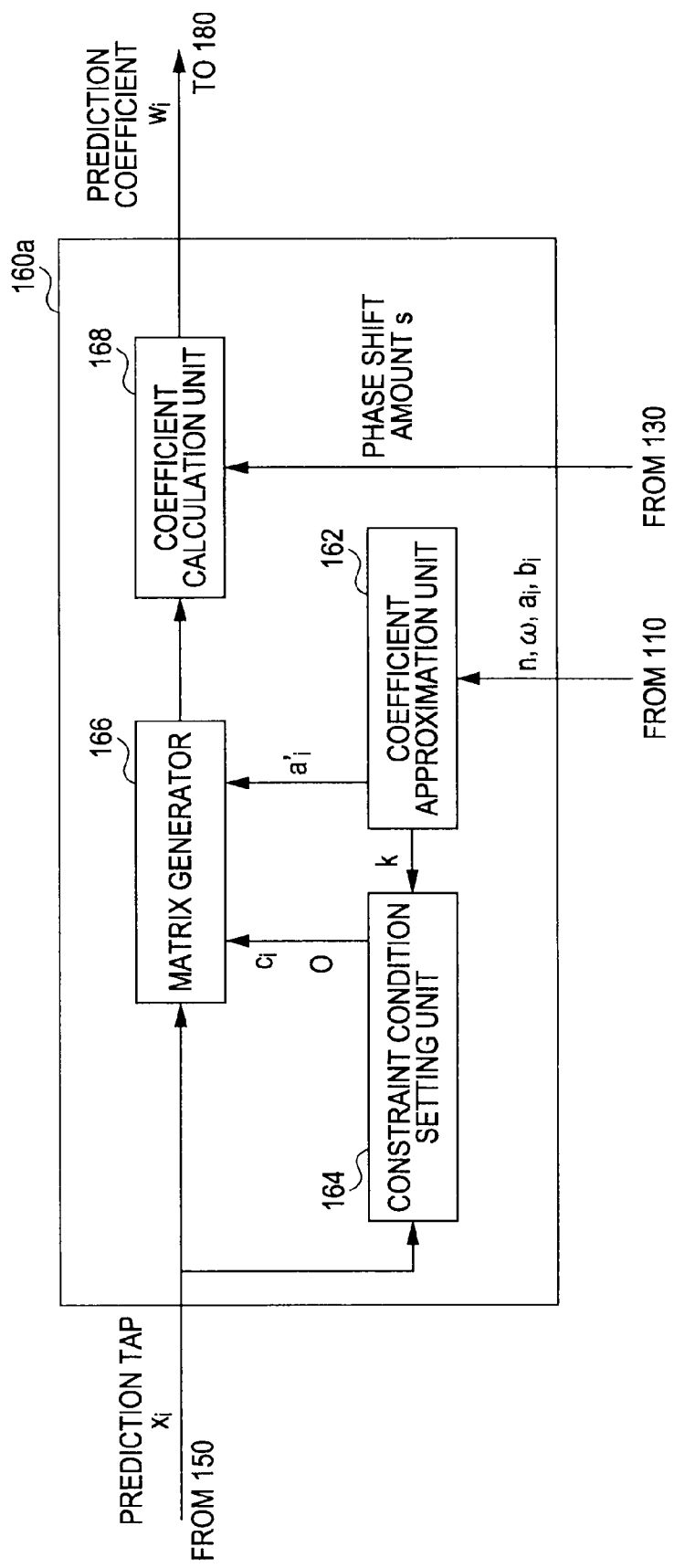
FIG. 12 is a block diagram showing a first exemplary configuration of a coefficient generator.

FIG. 12 is a block diagram showing the configuration of the coefficient generator 160a according to a first exemplary configuration. The coefficient generator 160a includes a coefficient approximation unit 162, a constraint condition setting unit 164, a matrix generator 166, and a coefficient calculation unit 168.

The coefficient approximation unit 162 calculates an approximate value of a coefficient of a relation expression between an obtained pixel value and an image-captured pixel value by using a characteristic parameter of a filter, which is input from the parameter input unit 110.

At this point, when the computation expression of the IIR filter shown in Expression (1) described above is applied to an obtained pixel value $B_i$ (i=1 to 4), Expressions (2) to (5) are derived.

$$B_1 = \sum_{i=1}^{n+1} a_i \cdot A_i - \sum_{i=2}^{n+1} b_i \cdot B_i \quad (2)$$

$$B_2 = \sum_{i=2}^{n+2} a_i \cdot A_i - \sum_{i=3}^{n+2} b_i \cdot B_i \quad (3)$$

$$B_3 = \sum_{i=3}^{n+3} a_i \cdot A_i - \sum_{i=4}^{n+3} b_i \cdot B_i \quad (4)$$

$$B_4 = \sum_{i=4}^{n+4} a_i \cdot A_i - \sum_{i=5}^{n+4} b_i \cdot B_i \quad (5)$$

When the obtained pixel values $B_i$ are sequentially expanded from these expressions, an infinite number of image-captured pixel values $A_i$ ($0 \leq i$) appear in the negative direction from $B_0$ as terms for which the target obtained pixel value $B_0$ is determined. Therefore, in the coefficient approximation unit 162, the relationship between the image-captured pixel value $A_i$ and the obtained pixel value $B_i$ is approximated so that the obtained pixel value $B_i$ is represented by using only a finite number of image-captured pixel values $A_i$ among an infinite number of image-captured pixel values $A_i$, which are in the vicinity of the target obtained pixel value $B_0$ and exert a significant influence upon the target obtained pixel value $B_0$.

Here, as an example, an approximation is performed using an image-captured pixel value $A_i$ ($0 \leq i \leq 6$). First, when the obtained pixel values $B_i$ are sequentially expanded and substituted in Expression (1), Expression (6) is derived.

$$B_0 = \sum_{i=0}^{n+6} \alpha_i \cdot A_i - \sum_{i=7}^{n+6} \beta_i \cdot B_i \quad (6)$$

where $\alpha_i$ and $\beta_i$ are values collectively representing coefficients applied to the term of each of $A_i$ and $B_i$, which are obtained by sequentially expanding the obtained pixel value $B_i$ and substituting it in Expression (1). Furthermore, only the term of $A_i$ ($0 \leq i \leq 6$) is extracted and approximated, thereby deriving Expression (7).

$$B_0 \approx \sum_{i=0}^{6} a'_i \cdot A_i \quad (7)$$

where the coefficient $a'_i$ (hereinafter will be referred to as an approximate coefficient) is represented by Expression (8) by using $\alpha_i$ calculated on the basis of the characteristic parameters $a_i$ and $b_i$.

$$a'_i = \frac{\alpha_i}{\sum_{i=0}^{6} \alpha_i} \quad (8)$$

Figure 13:
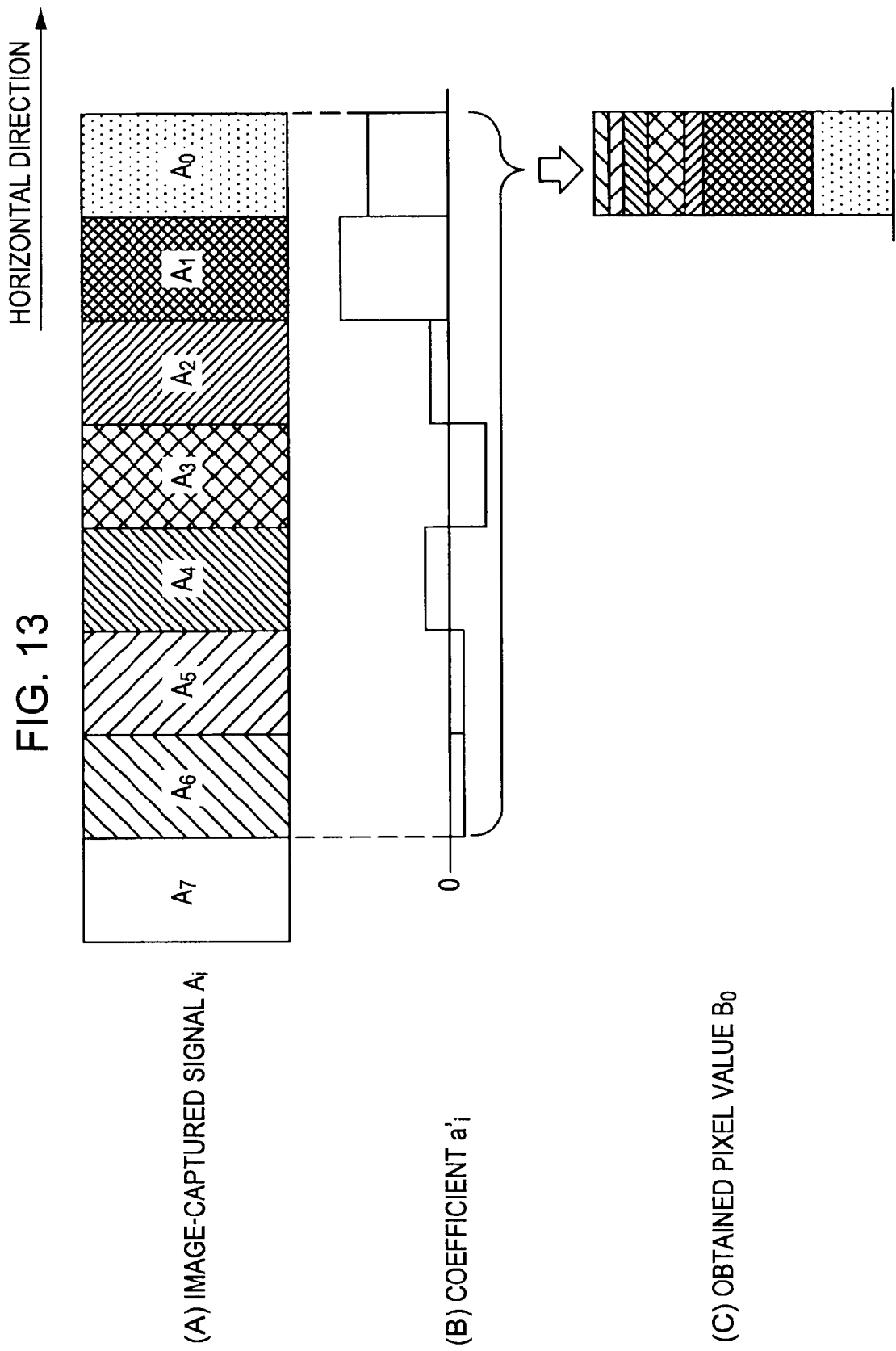
FIG. 13 is an illustration of the relationship between an image-captured signal and an obtained signal.

FIG. 13 is a schematic view conceptually showing an approximation expression of Expression (7). In part (A) of FIG. 13, each pixel value $A_i$ ($0 \leq i \leq 6$) of an image-captured signal stored as electric charge in the image-capturing unit 20 equivalent to, for example, a CCD is shown. Part (B) of FIG. 13 shows, in the form of a bar graph in which zero is used as a reference, an approximate coefficient $a'_i$ multiplied to each pixel value $A_i$ of the image-captured signal. Part (C) of FIG. 13 shows a pixel value $B_0$ of an obtained signal obtained in such a manner that a coefficient $a'_i$ is multiplied to each pixel value $A_i$ of the image-captured signal and these are integrated.

As shown in part (B) of FIG. 13, the approximate coefficient $a'_i$ may take a negative value. Therefore, in practice, it is not that all the electric charge is added, as shown in FIG. 13. However, in part (C) of FIG. 13, for the sake of description, it is shown that all the electric charge is integrated.

Referring back to FIG. 12, the description of the coefficient generator 160a according to the first exemplary configuration is continued.

By using the approximate coefficient $a'_i$ generated by the coefficient approximation unit 162, the matrix generator 166 generates a matrix expression for calculating a prediction coefficient on the basis of the number of pixels contained in the prediction tap $x_i$ input from the prediction tap forming unit 150.

When the number of pixels contained in the prediction tap $x_i$ is denoted as m, the number of approximate coefficients is denoted as k, m relation expressions hold between image-captured signals and obtained signals represented by Expression (9) described below.

$$B_l = \sum_{i=l}^{l+k-1} a'_{i-l} \cdot A_i \quad (9)$$

where l is an integer greater than or equal to 0 and smaller than or equal to m−1. When m relation expressions, which are represented by Expression (9), are represented in the form of a matrix format, Expression (10) is derived.

$$\begin{pmatrix} B_0 \\ B_1 \\ \vdots \\ B_{m-1} \end{pmatrix} = \quad (10)$$

$$\begin{pmatrix} a'_0 & a'_1 & a'_0 & \cdots & a'_{k-1} & 0 & 0 & \cdots & 0 \\ 0 & a'_0 & a'_1 & \cdots & a'_{k-2} & a'_{k-1} & 0 & \cdots & 0 \\ \vdots & \ddots & \ddots & \ddots & \ddots & \ddots & \ddots & \ddots & \vdots \\ 0 & \cdots & 0 & a'_0 & a'_1 & \cdots & a'_{k-2} & a'_{k-1} & 0 \\ 0 & \cdots & 0 & 0 & a'_0 & a'_1 & \cdots & a'_{k-2} & a'_{k-1} \end{pmatrix} \begin{pmatrix} A_0 \\ A_1 \\ \vdots \\ A_{m-1+k-1} \end{pmatrix}$$

Furthermore, when the matrix of the image-captured signals is denoted as A, the matrix of the approximate coefficients is denoted as a', and the matrix of the obtained signals is denoted as B, the relation expression between the image-captured signals and the obtained signals, which are represented by Expression (10), can also be represented as shown in Expression (11).

$$B = a'A \qquad (11)$$

The matrix generator 166 generates a matrix expression shown in Expression (10) or (11). However, in order to solve this relation expression, the order of the expression lacks. Therefore, furthermore, in the constraint condition setting unit 164, a constraint condition expression for calculating $A_i$ is set, thereby supplementing the lacking order of the expression.

On the basis of the number of the approximate coefficients k input from the coefficient approximation unit 162 and the number of pixels m contained in the prediction tap $x_i$, the constraint condition setting unit 164 sets a constraint condition expression with regard to an image-captured pixel value $A_i$ described below. As the constraint condition expression, it is preferable that a relation expression be used that is defined by multiplying a predetermined constraint condition coefficient $c_i$ to the image-captured pixel value $A_i$ and by using the sum or the difference thereof. Any constraint condition expression may be used as long as it is an expression representing an appropriate relation among the pixels of the image-captured pixel values $A_i$. Here, a description is given of an example in which an expression representing the nature of the neighborhood correlation of an image is used.

As an expression representing the nature of the neighborhood correlation of an image, for example, a relation expression of Expression (12) representing that the pixel values of adjacent pixels are equal can be used.

$$A_i = A_{i+1} \qquad (12)$$

When Expression (12) is represented in the form of a matrix, the following expression is derived.

$$\begin{pmatrix} 0 \\ 0 \\ \vdots \\ 0 \\ 0 \end{pmatrix} = \begin{pmatrix} 1 & -1 & 0 & 0 & \cdots & 0 \\ 0 & 1 & -1 & 0 & \cdots & 0 \\ \vdots & \ddots & \ddots & \ddots & \ddots & \vdots \\ 0 & \cdots & 0 & 1 & -1 & 0 \\ 0 & \cdots & 0 & 0 & 1 & -1 \end{pmatrix} \begin{pmatrix} A_0 \\ A_1 \\ \vdots \\ A_{m-1+k-1} \end{pmatrix} \qquad (13)$$

Alternatively, as an expression representing the nature of the neighborhood correlation of an image, a relation expression of Expression (14) representing that, for example, the amount of change among adjacent pixels is fixed may be used.

$$A_i - A_{i+1} = A_{i+1} - A_{i+2} \qquad (14)$$

When Expression (14) is represented in the form of a matrix, the following expression is derived.

$$\begin{pmatrix} 0 \\ 0 \\ \vdots \\ 0 \\ 0 \end{pmatrix} = \begin{pmatrix} 1 & -2 & 1 & 0 & 0 & \cdots & 0 \\ 0 & 1 & -2 & 1 & 0 & \cdots & 0 \\ \vdots & \ddots & \ddots & \ddots & \ddots & \ddots & \vdots \\ 0 & \cdots & 0 & 1 & -2 & 1 & 0 \\ 0 & \cdots & 0 & 0 & 1 & -2 & 1 \end{pmatrix} \begin{pmatrix} A_0 \\ A_1 \\ \vdots \\ A_{m-1+k-1} \end{pmatrix} \qquad (15)$$

Furthermore, in a coefficient calculation unit 168 (to be described later), in order to be capable of adjusting the influence of the constraint condition expression when a prediction coefficient is calculated, Expression (16) or (17) may be used in place of Expression (13) or (15).

$$\begin{pmatrix} 0 \\ 0 \\ \vdots \\ 0 \\ 0 \end{pmatrix} = \begin{pmatrix} w & -w & 0 & 0 & \cdots & 0 \\ 0 & w & -w & 0 & \cdots & 0 \\ \vdots & \ddots & \ddots & \ddots & \ddots & \vdots \\ 0 & \cdots & 0 & w & -w & 0 \\ 0 & \cdots & 0 & 0 & w & -w \end{pmatrix} \begin{pmatrix} A_0 \\ A_1 \\ \vdots \\ A_{m-1+k-1} \end{pmatrix} \qquad (16)$$

$$\begin{pmatrix} 0 \\ 0 \\ \vdots \\ 0 \\ 0 \end{pmatrix} = \begin{pmatrix} w & -2w & w & 0 & 0 & \cdots & 0 \\ 0 & w & -2w & w & 0 & \cdots & 0 \\ \vdots & \ddots & \ddots & \ddots & \ddots & \ddots & \vdots \\ 0 & \cdots & 0 & w & -2w & w & 0 \\ 0 & \cdots & 0 & 0 & w & -2w & w \end{pmatrix} \begin{pmatrix} A_0 \\ A_1 \\ \vdots \\ A_{m-1+k-1} \end{pmatrix} \qquad (17)$$

In a case where Expression (16) or (17) is used, w is set to a large value when the influence of the constraint condition expression is made strong and w is set to a small value when the influence of the constraint condition expression is made weak.

When the left side of these constraint condition expressions is denoted as O, the matrix of the constraint condition coefficient is denoted as c, and the matrix of the image-captured signals is denoted as A, Expression (13), (15), (16), or (17) can be represented as in the following expression:

$$O = cA \qquad (18)$$

The constraint condition setting unit 164 outputs the matrix expression of Expression (18) as a constraint condition expression to the matrix generator 166.

Referring back to FIG. 12, the description of the coefficient generator 160*a* according to the first exemplary configuration is continued.

The matrix generator 166 combines the relation expression between the image-captured signal and the obtained signal shown in Expression (10) or (11) with the constraint condition expression shown in Expression (18), thereby generating Expression (19) described below.

$$\begin{pmatrix} B \\ O \end{pmatrix} = \begin{pmatrix} a' \\ c \end{pmatrix} A \qquad (19)$$

Expression (19) has an order sufficient to determine the solution of the prediction coefficient because the order lacking in the relation expression between the image-captured signal and the obtained signal is supplemented by the constraint condition expression. EXPRESSION (19) generated by the matrix generator 166 is output to the coefficient calculation unit 168.

The coefficient calculation unit 168 calculates a prediction coefficient used to predict the image-captured signal on the basis of the obtained signal by solving Expression (19) output from the matrix generator 166.

When Expression (19) is represented like Expression (20), the prediction coefficient can be determined as a coefficient at which E of Expression (21) is minimized.

$$M = FA \quad (20)$$

$$E = (M - FA)^2 \quad (21)$$

The coefficient at which E of Expression (21) is minimized can be calculated as a value that satisfies Expression (22) below:

$$\frac{dE}{dA} = 0 \quad (22)$$

A prediction coefficient matrix W in which a prediction coefficient is used as each element can be calculated as in Expression (23) below.

$$W = (FF^t)^{-1} F^t \quad (23)$$

where t represents the transposition of the matrix, and −1 represents an inverse matrix. Furthermore, the following expression is derived on the basis of Expressions (19), (20), and (23).

$$A = WM = W \begin{pmatrix} B \\ O \end{pmatrix} \quad (24)$$

That is, the prediction coefficient matrix W is a matrix for providing a coefficient used to predict all the elements of a matrix A representing the pixel values of the image-captured signal on the basis of a matrix B. The first row of the prediction coefficient matrix W is a coefficient used to predict an image-captured pixel value $A_0$. The second row is a coefficient used to predict an image-captured pixel value $A_1$. Hereinafter, the i-th row is a coefficient used to predict an image-captured pixel value $A_{i-1}$.

On the basis of the prediction coefficient matrix W calculated as described above, the coefficient calculation unit 168 extracts a prediction coefficient $w_i$ corresponding to the target pixel position of the prediction tap formed by the prediction tap forming unit 150, and outputs the prediction coefficient $w_i$ as the result of the coefficient generation. When the prediction coefficient $w_i$ is extracted from the prediction coefficient matrix W, the phase shift amount s output from the phase-shift-amount detector 130 is considered. For example, in a case where, as shown in FIG. 11, the phase shift amount s=−1, $B_3$, which is the fourth pixel from the pixel at the right end in the horizontal direction, is at the position of the target pixel, and thus the coefficient at the fourth row of the prediction coefficient matrix W is output as a prediction coefficient $w_i$.

Figure 14:
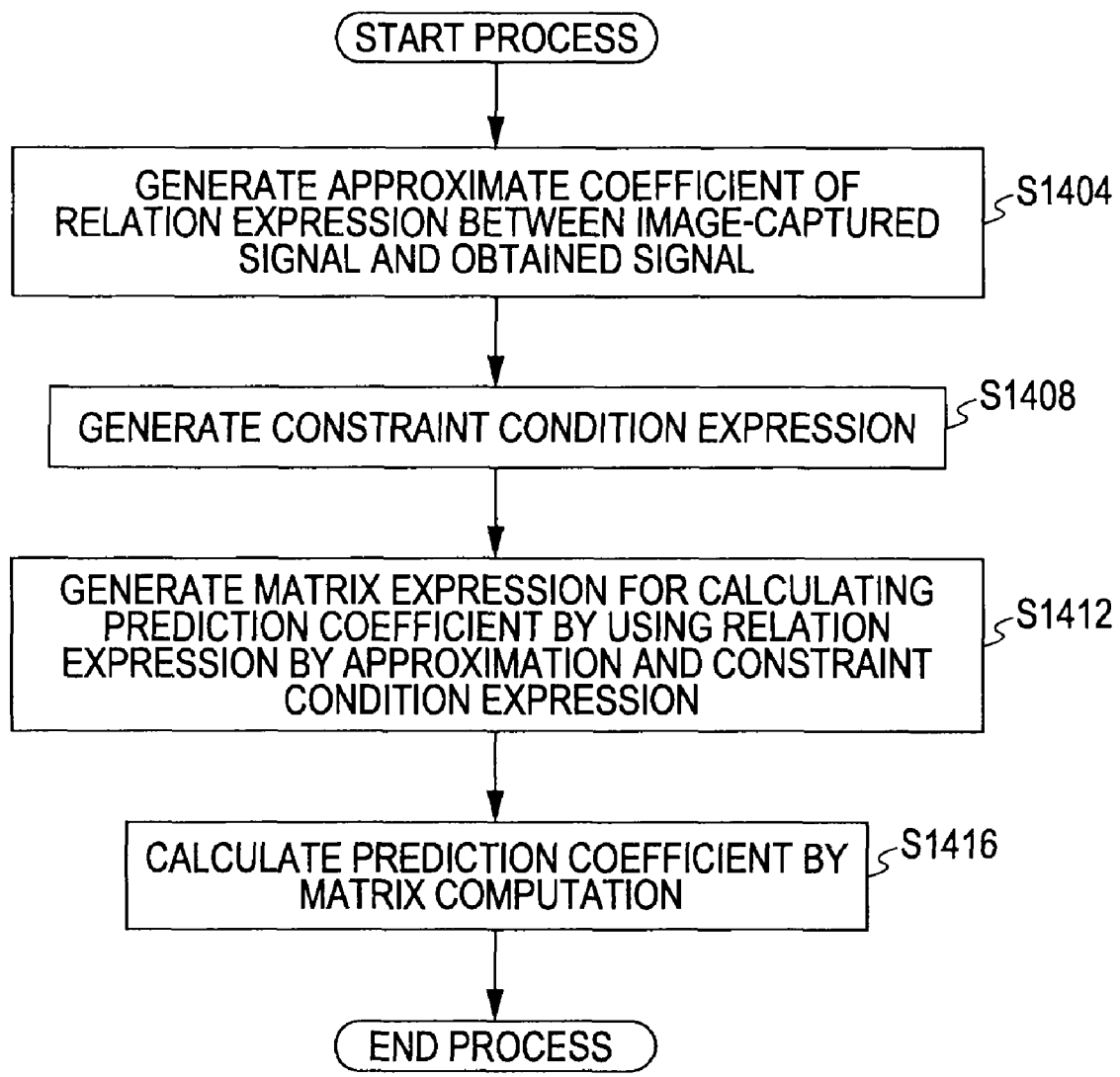
FIG. 14 is a flowchart showing the flow of the flow of a coefficient generation process according to a first exemplary configuration of a coefficient generator.

FIG. 14 is a flowchart showing the flow of a coefficient generation process performed by the coefficient generator 160a according to the first exemplary configuration.

Referring to FIG. 14, first, the coefficient approximation unit 162 generates an approximate coefficient of a relation expression between an image-captured signal and an obtained signal on the basis of a characteristic parameter (S1404).

Next, the constraint condition setting unit 164 generates a constraint condition expression for supplementing the order of the relation expression generated in S1404 on the basis of the number of approximate coefficients input from the coefficient approximation unit 162 and the number of pixels contained in the prediction tap (S1408).

After that, the matrix generator 166 generates a matrix expression for calculating a prediction coefficient by using the relation expression between the image-captured signal and the obtained signal, in which the approximate coefficient generated in S1404 is used, and the constraint condition expression generated in S1408 (S1412).

Then, in the coefficient calculation unit 168, a prediction coefficient matrix is calculated by solving the matrix expression generated in S1412, and a prediction coefficient used to calculate the target image-captured pixel value is extracted and output (S1416).

Up to this point, the first exemplary configuration of the coefficient generator 160 has been described with reference to FIGS. 12 to 14. According to the first exemplary configuration of the coefficient generator 160, it is possible to calculate and obtain a prediction coefficient used to predict a target image-captured pixel value by using a relation expression between the image-captured signal and the obtained signal generated on the basis of the characteristic parameter input from the parameter input unit 110, and the constraint condition expression generated on the basis of the nature of the neighborhood correlation of the image.

Figure 15:
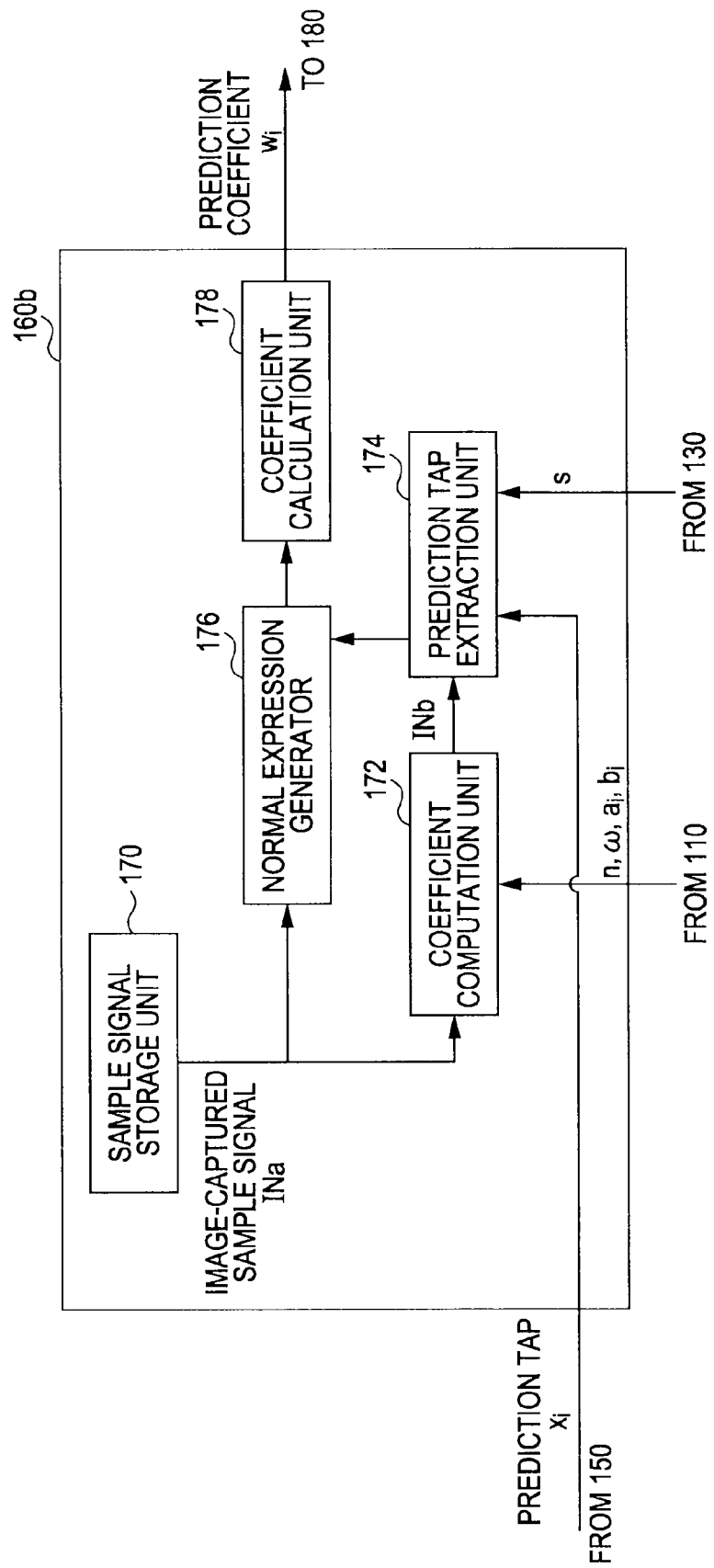
FIG. 15 is a block diagram showing a second exemplary configuration of the coefficient generator.

Next, a description will be given, with reference to FIGS. 15 and 16, of a second exemplary configuration of the coefficient generator 160. FIG. 15 is a block diagram showing the configuration of a coefficient generator 160b according to the second exemplary configuration. The coefficient generator 160b includes a sample signal storage unit 170, a coefficient computation unit 172, a prediction tap extraction unit 174, a normal expression generator 176, and a coefficient calculation unit 178.

The sample signal storage unit 170 is a storage area possessed by the coefficient generator 160b and stores an image-captured sample signal INa, which is a sample value of an arbitrary image-captured signal. When generating the prediction coefficient, the sample signal storage unit 170 outputs the image-captured sample signal INa to the coefficient computation unit 172 and the normal expression generator 176.

The coefficient computation unit 172 performs filter computation represented by Expression (1) described above on the image-captured sample signal INa input from the sample signal storage unit 170 by using the characteristic parameter input from the parameter input unit 110. Then, the coefficient computation unit 172 outputs the obtained sample signal INb corresponding to the obtained signal for the image-captured sample signal INa to the prediction tap extraction unit 174.

Similarly to the processing of the prediction tap forming unit 150 described with reference to FIG. 11, the prediction tap extraction unit 174 extracts a prediction tap for generating a coefficient from the obtained sample signal INb, and outputs the prediction tap to the normal expression generator 176.

Instead of extracting a prediction tap for generating a coefficient from the obtained sample signal INb in the prediction tap extraction unit 174, the phase of the obtained sample signal INb output from the coefficient computation unit 172 may be returned to the original on the basis of the phase shift amount s. In that case, it is also necessary to return the phase of the prediction tap $x_i$ formed in the prediction tap forming unit 150 to the original.

The normal expression generator 176 generates the following prediction expression by using the image-captured sample signal INa input from the sample signal storage unit 170 and the prediction tap for generating a coefficient input from the prediction tap extraction unit 174:

$$A_k = \sum_{i=1}^{m} w_i B_{ki} \quad (25)$$

where $A_k$ represents the pixel value at the target pixel position k of the image-captured sample signal INa, $B_{ki}$ represents the pixel value at the target pixel position k of the prediction tap i for generating a coefficient extracted from the obtained sample signal INb, m represents the number of pixels contained in the prediction tap, and $w_i$ represents the prediction coefficient. Then, when the number of pixels used to generate the prediction expression is denoted as N, the prediction coefficient $w_i$ can be obtained as a coefficient at which E of Expression (26) is minimized.

$$E = \sum_{k=1}^{N} \left( A_k - \sum_{i=0}^{m} w_i B_{ki} \right)^2 \quad (26)$$

The coefficient at which E of Expression (26) is minimized can be calculated as a value that satisfies Expression (27) below.

$$\frac{dE}{dw_i} = 0 \quad (27)$$

When Expression (26) is expanded, Expression (30) is derived by using Expressions (28) and (29) described below:

$$X_{ij} = \sum_{k=1}^{N} B_{ki} B_{kj} \quad (28)$$

$$Y_i = \sum_{k=1}^{N} B_{ki} A_i \quad (29)$$

$$\begin{pmatrix} X_{11} & X_{12} & \cdots & X_{1m} \\ X_{21} & X_{22} & \cdots & X_{2m} \\ \vdots & \vdots & \ddots & \vdots \\ X_{m1} & X_{m2} & \cdots & X_{mm} \end{pmatrix} \begin{pmatrix} w_1 \\ w_2 \\ \vdots \\ w_m \end{pmatrix} = \begin{pmatrix} Y_1 \\ Y_2 \\ \vdots \\ Y_m \end{pmatrix} \quad (30)$$

Expression (30) is an expression that is generally called a normal expression. The normal expression generator 176 generates a normal expression shown in Expression (30) and outputs the normal expression to the coefficient calculation unit 178.

The coefficient calculation unit 178 solves a normal expression of Expression (30) input from the normal expression generator 176 with regard to $w_i$ by using a sweeping-out method (Gauss's elimination method or Gauss-Jordan's elimination method) or the like, and outputs a prediction coefficient $w_i$.

Figure 16:
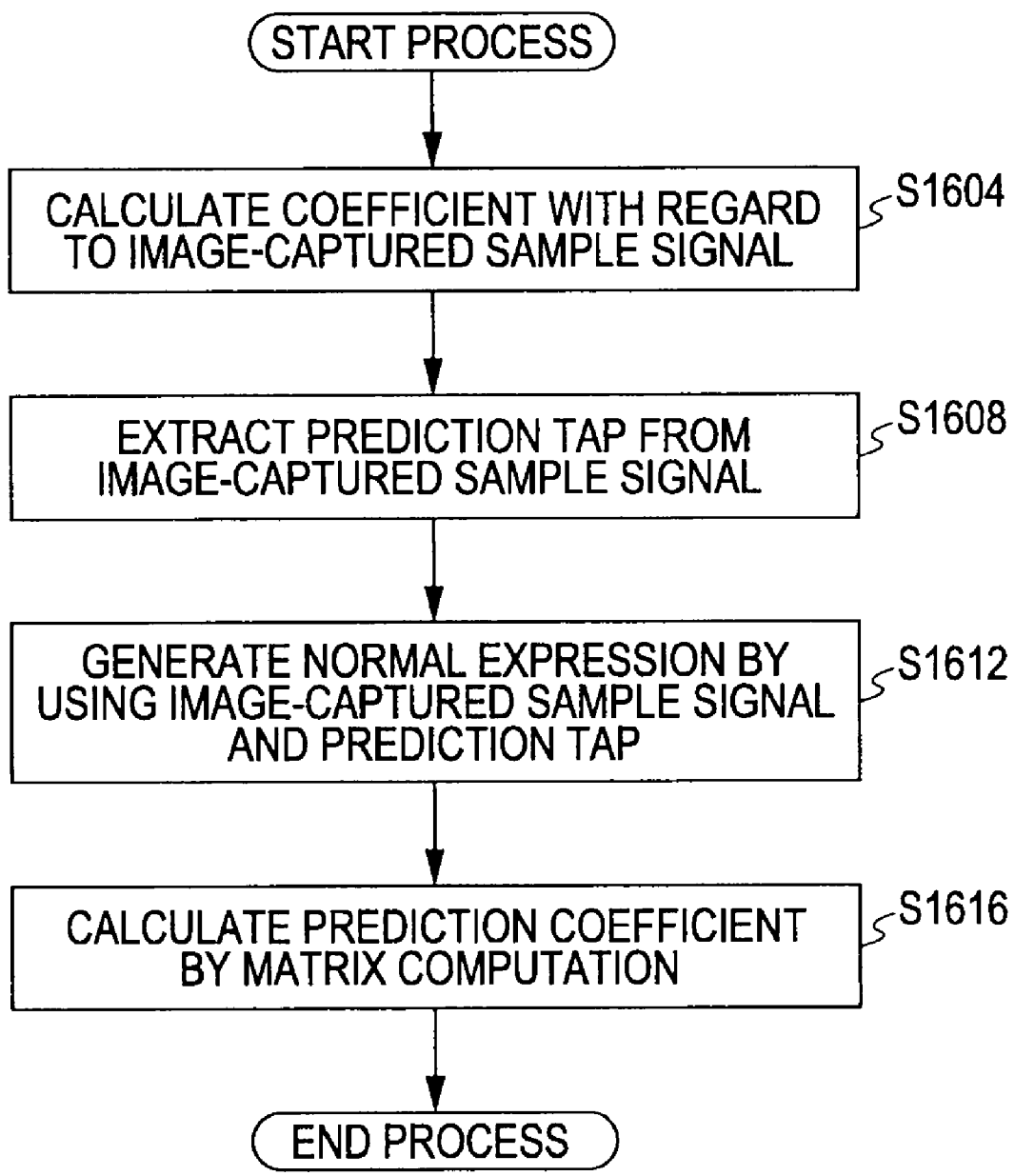
FIG. 16 is a flowchart showing the flow of the coefficient generation process according to a second exemplary configuration of the coefficient generator.

FIG. 16 is a flowchart showing the flow of a coefficient generation process performed by the coefficient generator 160b according to the second exemplary configuration.

Referring to FIG. 16, first, the coefficient computation unit 172 performs coefficient computation on the image-captured sample signal obtained from the sample signal storage unit 170 by using the characteristic parameter input from the parameter input unit 110, and outputs an obtained sample signal (S1604).

Next, the prediction tap extraction unit 174 extracts a prediction tap from among the obtained sample signals input from the coefficient computation unit 172, the prediction tap being used to calculate a prediction coefficient (S1608).

After that, the normal expression generator 176 generates a normal expression for calculating a prediction coefficient by using the image-captured sample signal obtained from the sample signal storage unit 170 and the prediction tap extracted from the obtained sample signals in S1608 (S1612).

Then, in the coefficient calculation unit 178, a prediction coefficient matrix is computed by solving the normal matrix expression generated in S1612, and a prediction coefficient used to calculate the target image-captured pixel value is obtained and output (S1616).

Up to this point, the second exemplary configuration of the coefficient generator 160 has been described. According to the second exemplary configuration of the coefficient generator 160, on the basis of the image-captured sample signals stored in advance and the characteristic parameter input from the parameter input unit 110, an obtained sample signal corresponding to the obtained signal for the image-captured sample signals is calculated. Then, on the basis of the expression generated using the image-captured sample signal and the prediction tap extracted from the calculated obtained sample signal, a prediction coefficient used to predict the image-captured pixel value is calculated and obtained.

Referring back to FIG. 6 again, the description of the configuration of the image processor 120 according to the present embodiment is further continued.

The prediction coefficient $w_i$ obtained by the coefficient generator 160 is input to the prediction computation unit 180. The prediction computation unit 180 performs product-sum computation between the input prediction coefficient $w_i$ and the prediction tap $x_i$, and generates an output signal y corresponding to the image-captured signal. The product-sum computation in the prediction computation unit 180 is represented by the following expression:

$$Y_k = \sum_{i=1}^{m} w_i x_{ki} \quad (31)$$

where $y_k$ represents the pixel value at the target pixel position k of the output signal, $x_{ki}$ represents the i-th pixel value of the prediction tap at the target pixel position k, which is formed from the obtained signal, m represents the number of pixels contained in the prediction tap, and $w_i$ represents the prediction coefficient.

The output signal $Y_k$ generated as a result of Expression (31) is output as a processing result of the image processor 120 according to the present embodiment from the prediction computation unit 180.

Figure 17:
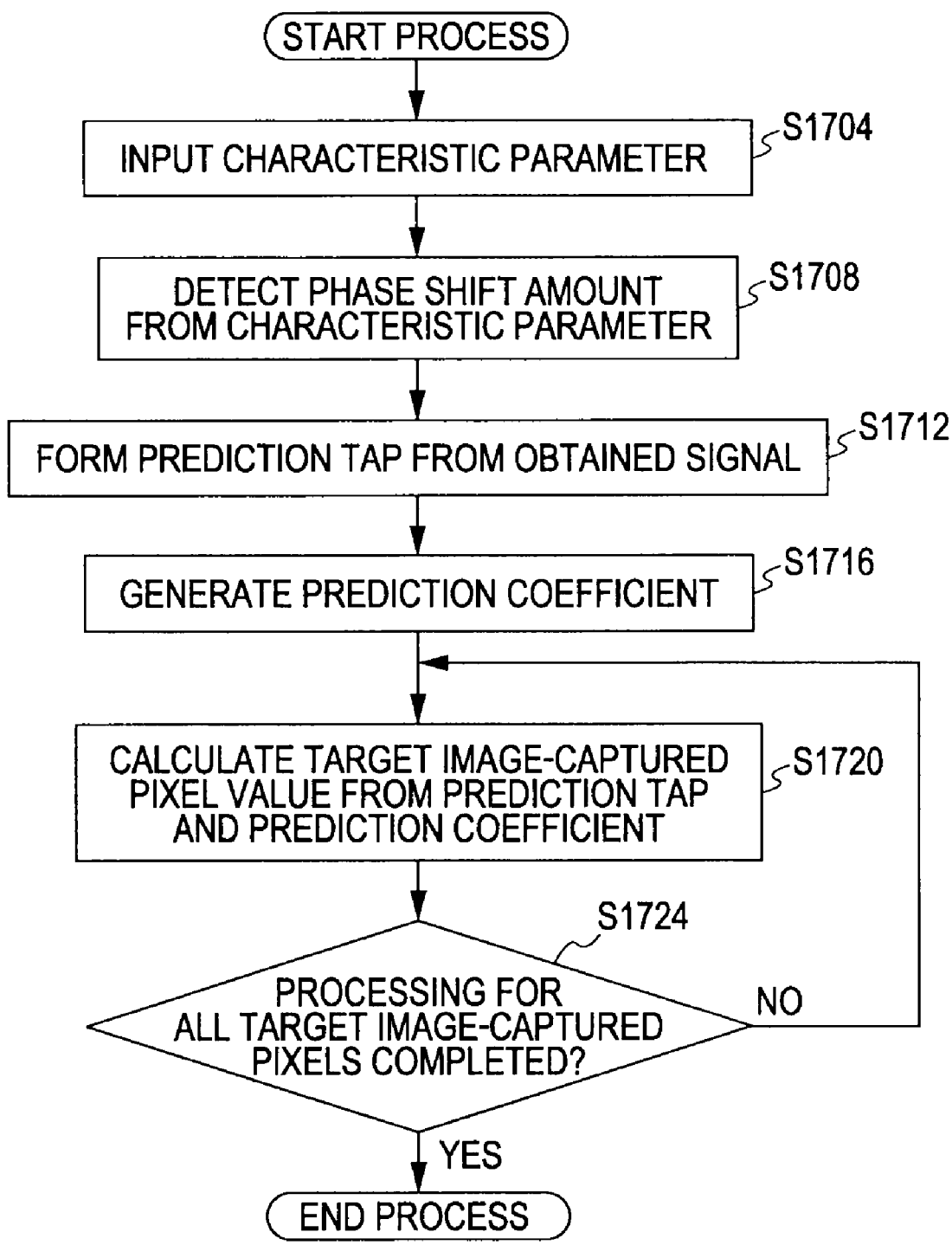
FIG. 17 is a flowchart showing the flow of processing by the image processing apparatus according to the first embodiment of the present invention.

FIG. 17 is a flowchart showing the flow of processing of the image processor 100 according to the present embodiment.

Referring to FIG. 17, first, a characteristic parameter indicating the characteristics of a filter process performed on an image-captured signal is input from the parameter input unit 110 to the image processor 120 (S1704).

Next, on the basis of the characteristic parameter input from the parameter input unit 110, the phase-shift-amount detector 130 detects the phase shift amount between the image-captured signal and the obtained signal obtained as a result of the filter process performed on the image-captured signal (S1708). The phase shift amount detected at this point is output to the prediction tap forming unit 150 and the coefficient generator 160.

After that, the prediction tap forming unit 150 forms a prediction tap composed of a plurality of obtained pixels used to predict the target image-captured pixel value from among the image-captured signals on the basis of the phase-shifted obtained signal (S1712). The prediction tap formed at this point is output to the coefficient generator 160 and the prediction computation unit 180.

Furthermore, the coefficient generator 160 generates and obtains a prediction coefficient used to predict the target image-captured pixel value on the basis of the characteristic parameter and the phase shift amount (S1716). The prediction coefficient obtained at this point is output to the prediction computation unit 180.

Then, in the prediction computation unit 180, the target image-captured pixel value is computed by product-sum computation between the prediction coefficient obtained by the coefficient generator 160 and the prediction tap output from the prediction tap forming unit 150 (S1720).

At this time, if processing for all the target image-capturing pixels has not been completed, the process of S1720 is repeated on the next target image-capturing pixel (S1724). If processing for all the target image-capturing pixels has been completed, the processing of the image processor 100 according to the present embodiment is completed.

Up to this point, the image processing apparatus 100 according to the first embodiment of the present invention has been described. According to the image processing apparatus 100 in accordance with the first embodiment, by predicting an image-captured signal from the obtained signal on the basis of the characteristic parameter input to the image processing apparatus 100 and by outputting the image-captured signal, it is possible to remove the distortion of the image, which occurs due to the filter process performed on the image-captured signal.

Usually, even if the content of the obtained signal input to the image processing apparatus 100 is changed, the prediction coefficient used to predict the image-captured signal from the obtained signal does not change if the type of filter is not changed. For this reason, as described below as a second embodiment of the present invention, generated prediction coefficients may be temporarily stored, so that when the type of filter does not change, the stored prediction coefficient can be obtained as appropriate and used to predict an image-captured signal.

Second Embodiment

Figure 18:
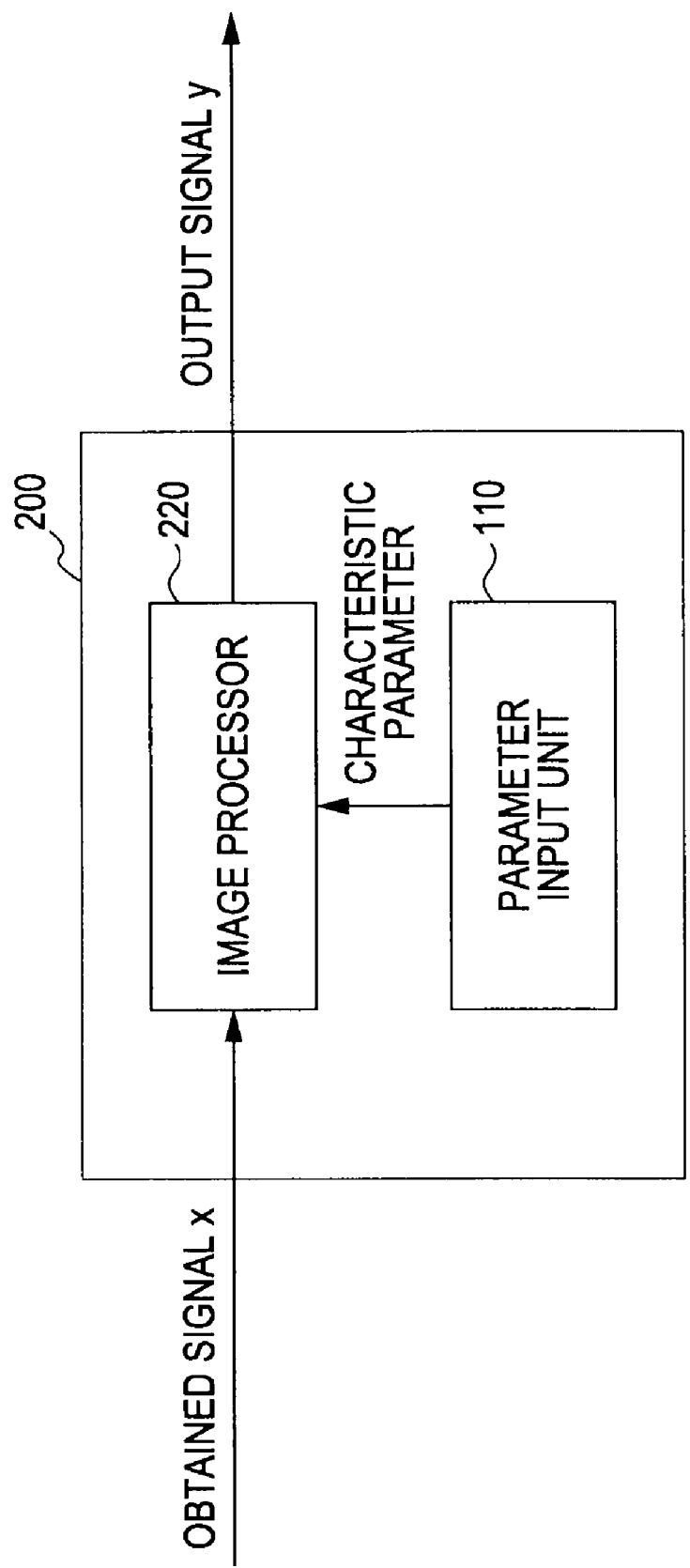
FIG. 18 is a block diagram showing the configuration of an image processing apparatus according to a second embodiment of the present invention.

FIG. 18 is a block diagram showing an outline of the configuration of an image processing apparatus 200 according to a second embodiment of the present invention. Referring to FIG. 18, the image processing apparatus 200 includes a parameter input unit 110 and an image processor 220.

The parameter input unit 110 is connected to the image processor 220 and inputs a characteristic parameter indicating the characteristics of a filter process to the image processor 220 in the same manner as in the first embodiment.

Figure 19:
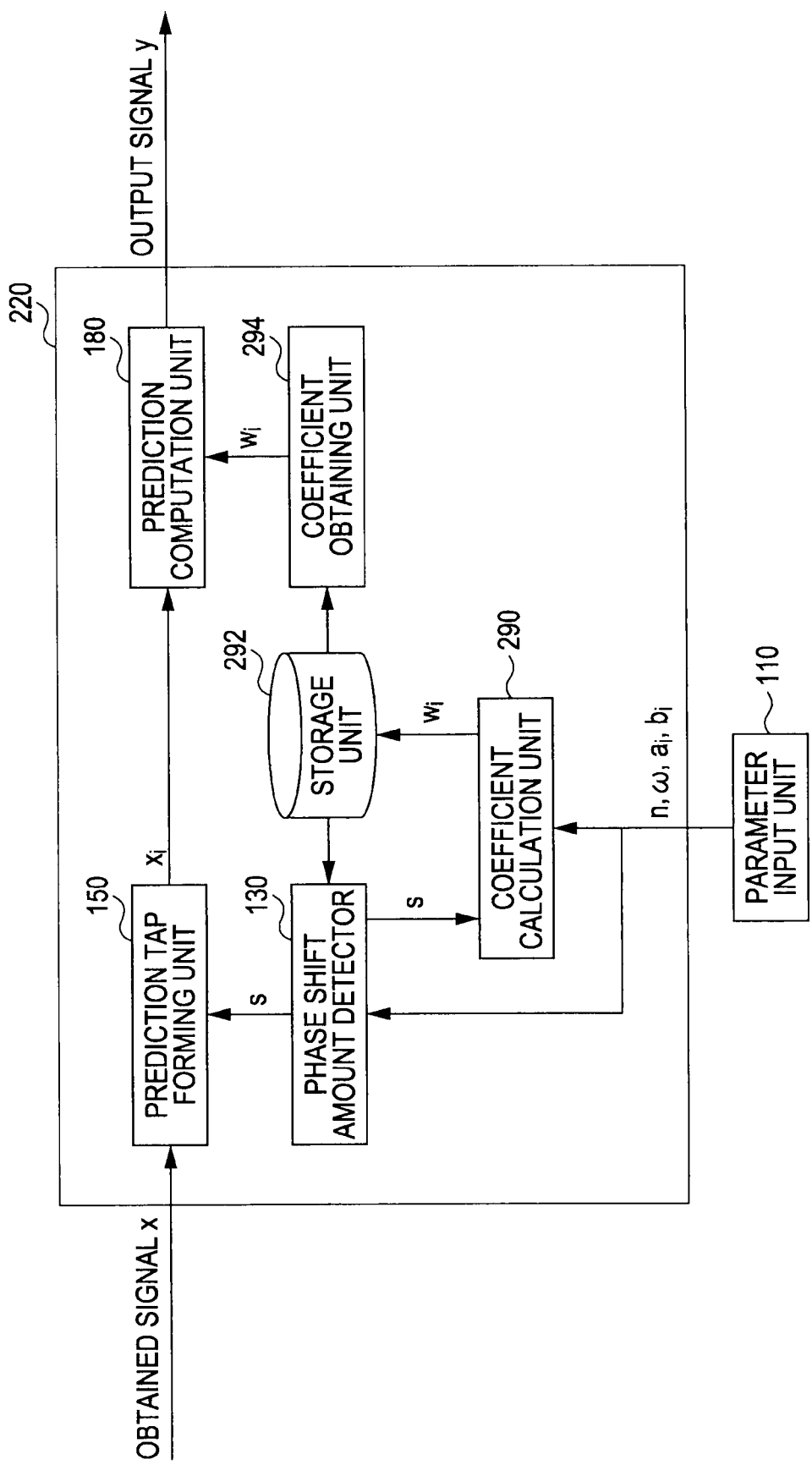
FIG. 19 is a block diagram showing the configuration of an image processing apparatus according to the second embodiment of the present invention.

The image processor 220 generates an output signal y corresponding to the image-captured signal predicted from an obtained signal x by using the characteristic parameter input from the parameter input unit 110.$xxj$ FIG. 19 is a block diagram showing the detailed configuration of the image processor 220 according to the present embodiment. Referring to FIG. 19, the image processor 220 includes a phase-shift-amount detector 130, a prediction tap forming unit 150, a prediction computation unit 180, a coefficient calculation unit 290, a storage unit 292, and a coefficient obtaining unit 294. A description will be given below of each component with emphasis on components differing from the components of the image processor 120 according to the first embodiment.

On the basis of the characteristic parameter and the phase shift amount s, the coefficient calculation unit 290 generates a prediction coefficient $w_i$ used to predict the target image-captured pixel value by product-sum computation with the prediction tap $x_i$ output from the prediction tap forming unit 150. The generation of the prediction coefficient by the coefficient calculation unit 290 can be performed by using a method based on the first exemplary configuration of the coefficient generator 160 described with reference to FIGS. 12 to 14 or by using a method based on the second exemplary configuration of the coefficient generator 160 described with reference to FIGS. 15 and 16. Then, the coefficient calculation unit 290 stores the prediction coefficient $w_i$ generated by one of the methods in a predetermined storage area of the storage unit 292 in place of outputting it to the prediction computation unit 180.

The storage unit 292 is an arbitrary storage area and is formed of storage means, such as, for example, a flash memory, a hard disk, or the like. In the storage unit 292, the prediction coefficient calculated by the coefficient calculation unit 290 is stored in such a manner as to be associated with, for example, the characteristic parameter. The storage unit 292 may be the same storage area as a storage unit 916 of FIG. 30 (to be described later).

When the coefficient obtaining unit 294 predictively computes an output signal y corresponding to the image-captured signal from the obtained signal x, the coefficient obtaining unit 294 obtains the prediction coefficient to be used by referring to the storage unit 292. The prediction coefficient to be used is, for example, a prediction coefficient stored in the storage unit 292 in such a manner as to be associated with the input characteristic parameter. Instead, only the most recently calculated prediction coefficient may be stored in the storage unit 292, and the coefficient obtaining unit 294 may obtain the most recent prediction coefficient.

Figure 20:
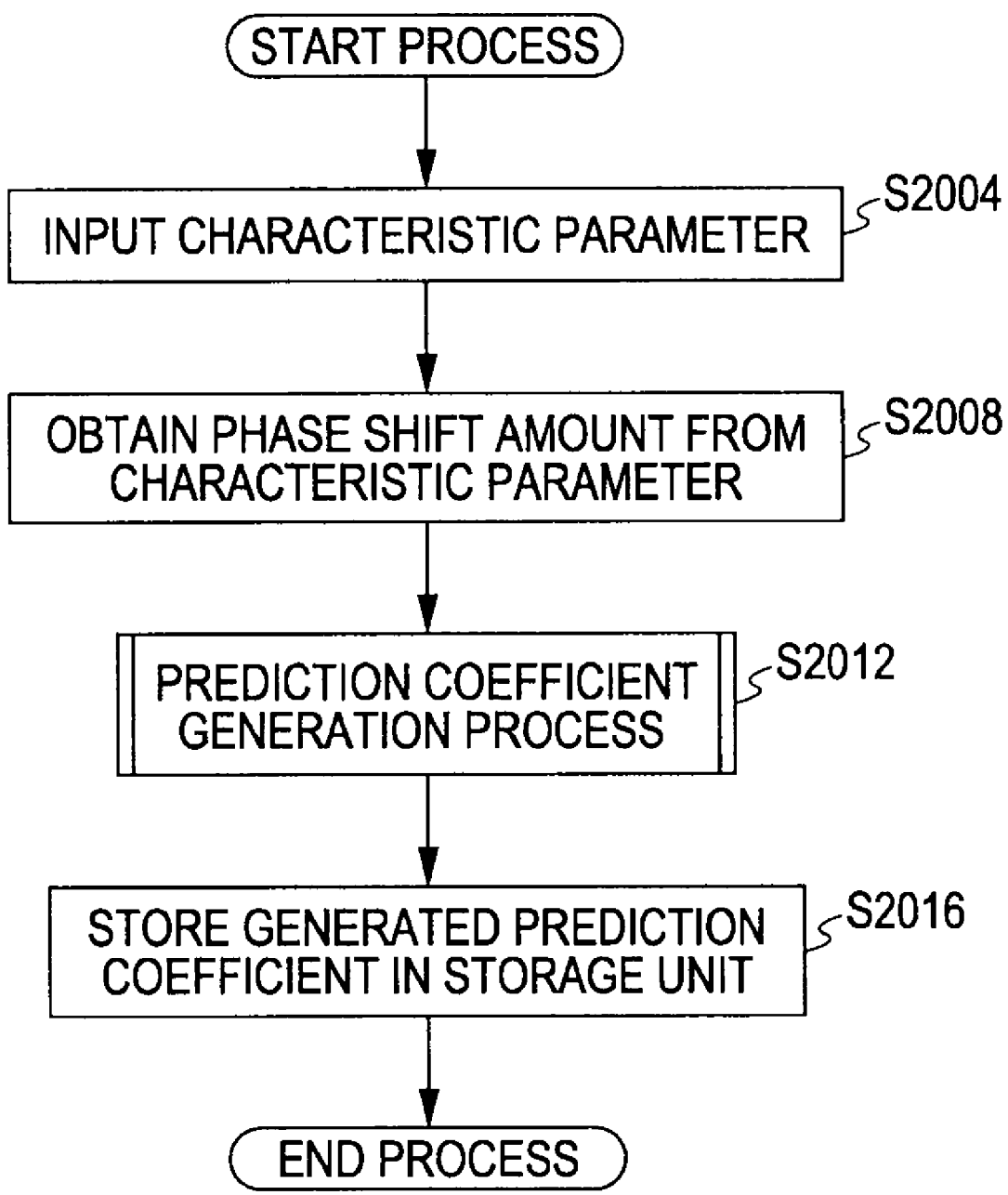
FIG. 20 is a flowchart showing the flow of processing of a coefficient calculation unit according to the second embodiment of the present invention.

FIG. 20 is a flowchart showing the flow of a coefficient calculation process performed by the coefficient calculation unit 290 according to the present embodiment.

Referring to FIG. 20, first, a characteristic parameter is input from the parameter input unit 110 (S2004). Next, the phase-shift-amount detector 130 obtains the phase shift amount detected from the characteristic parameter (S2008). After that, coefficient generation described with reference to FIG. 14 or 16 is performed, thereby calculating a prediction coefficient used to predict an image-captured signal from the obtained signal (S2012). Then, the calculated prediction coefficient is stored in the storage unit 294 (S2016).

Such a coefficient calculation process should be performed once at the time the characteristic parameter is changed rather than each time the obtained signal is input.

After that, when an obtained signal x is input to the image processing apparatus 200, the coefficient obtaining unit 294 obtains the prediction coefficient calculated in advance from the storage unit 292, and performs a prediction computation process for calculating and outputting each image-captured pixel value.

Figure 21:
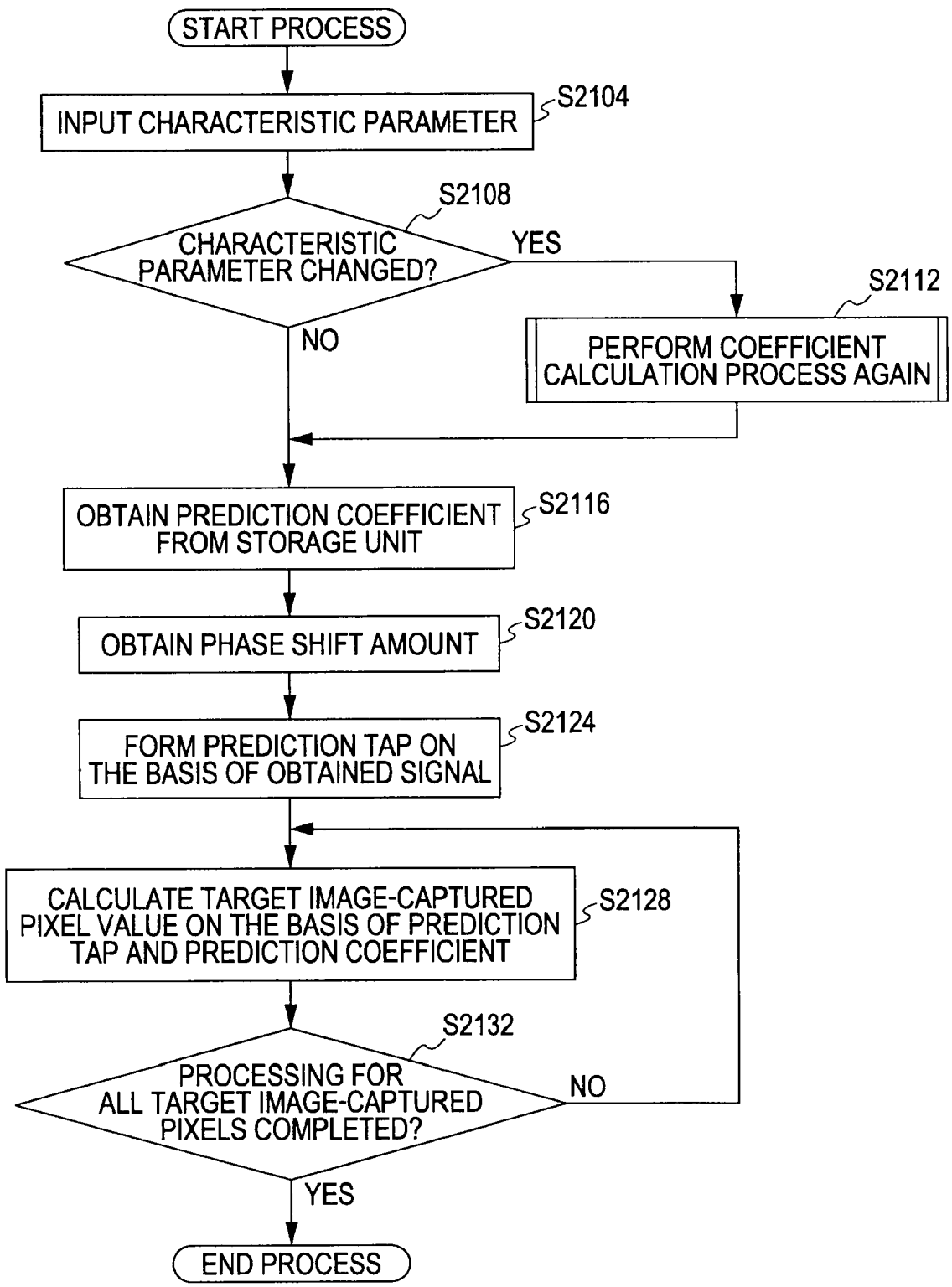
FIG. 21 is a flowchart showing the flow of a prediction computation process of the image processing apparatus according to the second embodiment of the present invention.

FIG. 21 is a flowchart showing the flow of a prediction computation process performed by the image processing apparatus 200 according to the present embodiment.

Referring to FIG. 21, first, a characteristic parameter is input from the parameter input unit 110 (S2104). Then, it is determined whether or not the characteristic parameter has changed (S2108). At this time, when the characteristic parameter has changed, the coefficient calculation process by the coefficient calculation unit 290, which is described with reference to FIG. 20, is performed once more, and a new prediction coefficient is stored in the storage unit 292.

After that, the coefficient obtaining unit 294 obtains the prediction coefficient from the storage unit 292 (S2116). Furthermore, the phase-shift-amount detector 130 calculates the phase shift amount or obtains it from the phase-shift table (S2120). Furthermore, the prediction tap forming unit 150 forms a prediction tap, in which the phase shift amount is considered, from the obtained signal (S2124).

Then, the prediction computation unit 180 calculates the target image-captured pixel value by product-sum computation between the prediction coefficient obtained by the coefficient obtaining unit 294 and the prediction tap output from the prediction tap forming unit 150 (S2128).

At this time, if the processing for all the target image-capturing pixels has not been completed, the process of S2128 is repeated on the next target image-capturing pixel (S2132). If the processing for all the target image-capturing pixels has been completed, the prediction computation process by the image processor 200 according to the present embodiment is completed.

Up to this point, the image processing apparatus 200 according to the second embodiment has been described with reference to FIGS. 18 to 21. According to the image processing apparatus 200 in accordance with the second embodiment, by storing a prediction coefficient calculated at the time the characteristic parameter is changed, it becomes not necessary to perform a process for generating a prediction coefficient used to predict an image-captured signal each time the obtained signal is input, and thus a load burdened on image processing is reduced.

Third Embodiment

In the first and second embodiments described thus far, an output signal predicted from the obtained signal on the basis of the characteristic parameter indicating the characteristics of the filter process performed on the image-captured signal is output from the image processing apparatus 100 or 200. The output signal corresponds to an image-captured signal restored by removing the distortion of the image from the obtained signal by the filter process and is suitable for various image processing based on a model defined in accordance with the state of the real world. Therefore, in the third embodiment, an image processing apparatus for performing a second prediction computation process for predicting an original image signal from an image-captured signal will be further described.

Figure 22:
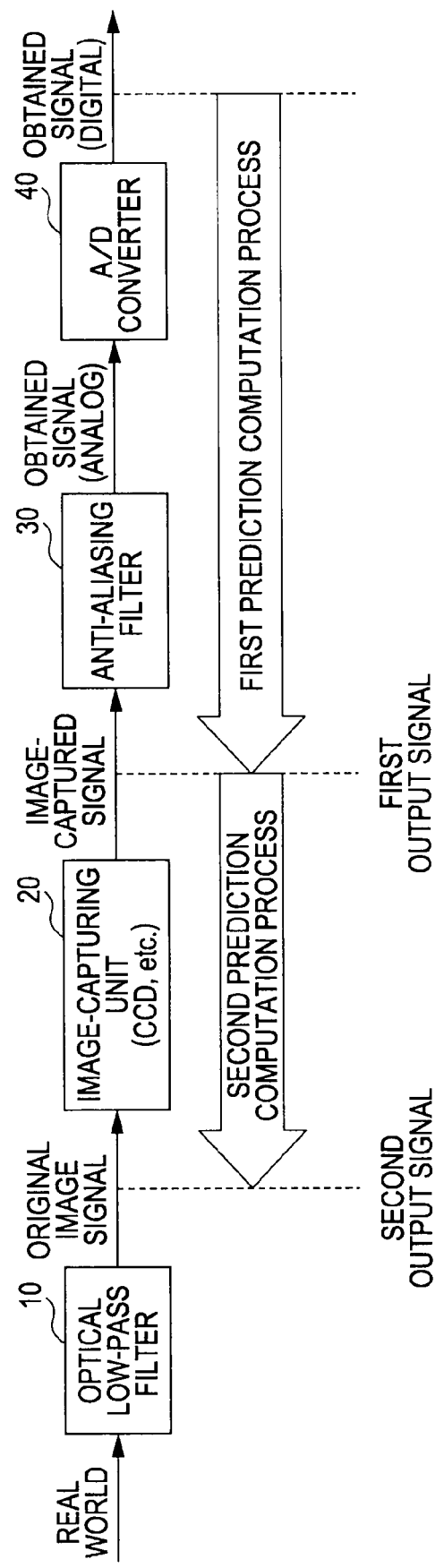
FIG. 22 is a schematic view showing a processing target range according to a third embodiment of the present invention.

FIG. 22 is a schematic view showing the range for the object of processing in the third embodiment. Referring to FIG. 22, an outline of processing from when light of the real world is captured until a digital signal is obtained, which is described with reference to FIG. 1, is shown anew.

Furthermore, in the lower part of FIG. 22, two arrows indicating a first prediction computation process and a second prediction computation process are shown. The first prediction computation process corresponds to a prediction computation process in the first and second embodiments described thus far and predicts an image-captured signal from an obtained signal. On the other hand, the second prediction computation process predicts an original image signal input to the image-capturing unit 20 from the output signal (first output signal) of the first prediction computation process, which corresponds to an image-captured signal. In the third embodiment, such first and second prediction computation processes are performed, and a second output signal corresponding to the original image signal is output in the end.

Figure 23:
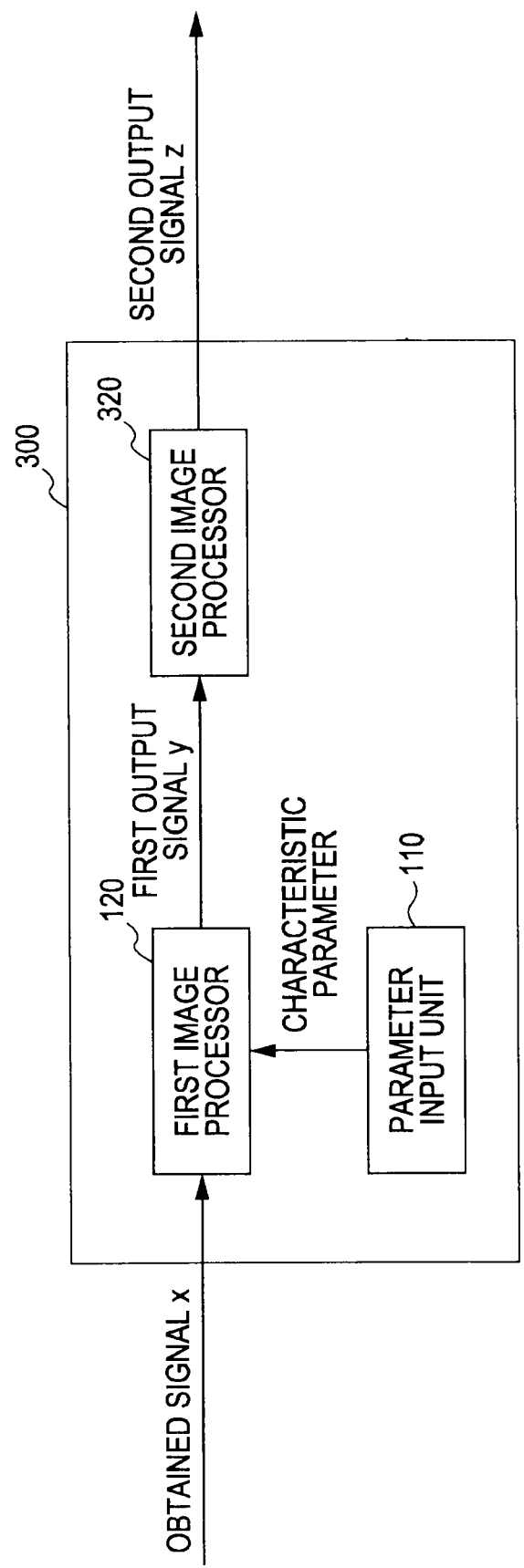
FIG. 23 is a block diagram showing the configuration of an image processing apparatus according to a third embodiment of the present invention.

FIG. 23 is a block diagram showing an outline of the configuration of an image processing apparatus 300 according to the present embodiment. Referring to FIG. 23, the image processing apparatus 300 includes a parameter input unit 110, a first image processor 120, and a second image processor 320.

Similarly to the first embodiment, the parameter input unit 110 inputs a characteristic parameter indicating the characteristics of a filter process to the first image processor 120.

The first image processor 120 is the same processor as the image processor 120 described in the first embodiment. That is, on the basis of the characteristic parameter input from the parameter input unit 110, the first image processor 120 generates a signal corresponding to an image-captured signal from the obtained signal x by prediction calculation, and outputs the signal as a first output signal y. The configuration of the image processing apparatus 300 is not limited to the configuration shown in FIG. 23. For example, the image processor 220 according to the second embodiment may be used in place of the first image processor 120 according to the present embodiment.

After the second image processor 320 performs a second prediction calculation based on a model (to be described later) for predicting an original image signal on the first output signal y output from the first image processor 120, the second image processor 320 outputs a second output signal z. As described with reference to FIG. 22, the second output signal z is a signal corresponding to the original image signal that is predicted from the first output signal y corresponding to the image-captured signal.

Here, a description will be given below, with reference to FIGS. 24 and 25, of a model used to correct blur by an auto-focus function of a digital still camera, which is handled in a second prediction computation process in the second image processor 320.

Blur due to an auto-focus function of a digital still camera refers to a phenomenon in which an image-captured signal in a state in which an edge of a subject is unclear as a result of image capturing being performed in a state in which focus is made on the background rather than on the subject originally desired to be image-captured by the user. In such a blur, in a case where an original image signal with no blur is to be predicted from the image-captured signal, a model having an integration effect due to blur is used.

Figure 24:
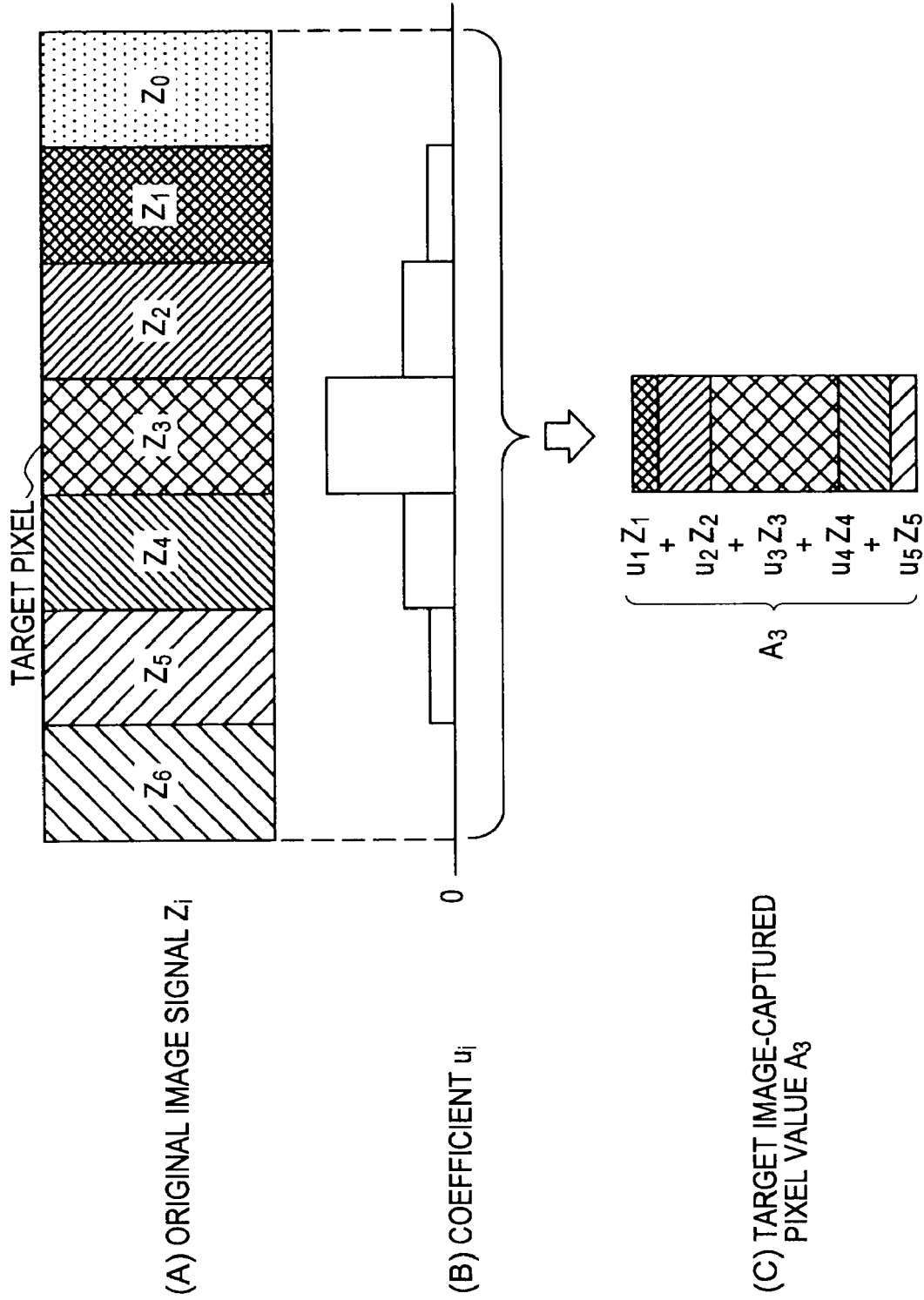
FIG. 24 is a schematic view showing an integration effect of blur due to an auto-focus function.

FIG. 24 is a schematic view showing a blur integration effect by an auto-focus function. Part (A) of FIG. 24 shows an original image signal $Z_i$ ($0 \leq i \leq 6$) input to the image-capturing unit 20 after passing through the optical low-pass filter 10. Part (B) of FIG. 24 shows, in the form of a bar graph in which zero is used as a reference, a coefficient $u_i$ representing the weight of the contribution of the pixel value in the neighborhood when the target image-captured pixel value is determined. The target pixel at this point is the pixel of i=3 in the center of the pixel sequence of part (A) of FIG. 24.

Part (C) of FIG. 24 shows a target image-captured pixel value $A_3$ given by product-sum of an original image signal $Z_i$ and a coefficient $u_i$. As can be understood from part (C) of FIG. 24, in a case where blur due to an auto-focus function occurs, focus is offset ahead or behind the subject, thereby the image-captured pixel value in which blur has occurred becomes a value such that a weight represented by a predetermined coefficient is multiplied to the pixel value of the original image signal in the neighborhood and is integrated. This is one kind of spatial integration effect during image capturing.

In FIG. 24, for the sake of convenience, a description has been given by using a one-dimensional pixel sequence. In a model of blur, in practice, the value of the pixel positioned in the vicinity of the target pixel on the two-dimensional light-receiving surface contributes to the target image-captured pixel value.

Figure 25:
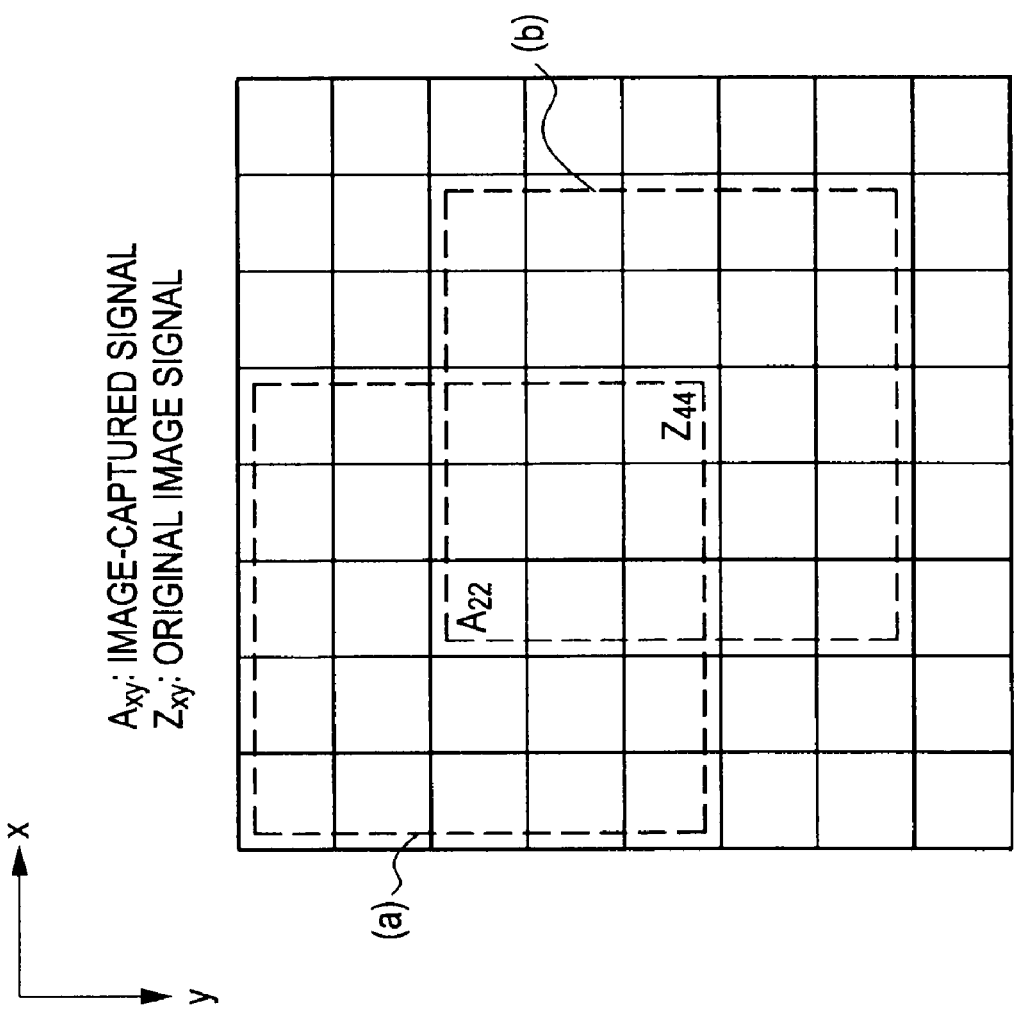
FIG. 25 is a schematic view showing the relationship between an image-captured signal and an original image signal on a two-dimensional plane.

FIG. 25 is a schematic view showing the relationship among image-captured signals and original image signals on the two-dimensional plane. Referring to FIG. 25, the two-dimensional plane is represented by the x axis and the y axis. Here, each box represented by the xy coordinates corresponds to each light-receiving area in the image-capturing unit 20.

When blur due to an auto-focus function occurs in the image-capturing unit 20 having a two-dimensional light-receiving surface shown in FIG. 25, a pixel value $A_{xy}$ of the image-captured signal is determined by, for example, the pixel values $Z_{xy}$ of the original image signals of 5×5=25 in the neighborhood.

In the example of FIG. 25, for example, the pixel value $A_{22}$ of the image-captured signal is determined on the basis of the pixel values of 25 original image signal surrounded by a frame (a) including $Z_{44}$. In a similar manner, when, for example, a pixel value $Z_{44}$ of the original image signal is to be predicted from the image-captured signal, it is to be understood that the pixel values of 25 image-captured signals surrounded by a frame (b) including $A_{22}$ should be considered.

The relation between an image-captured signal and an original image signal, which is based on a model of blur shown in FIGS. 24 and 25, is represented by, for example, Expressions (32) to (35). Here, as prediction taps, 8×8=64 (8 in the x direction×8 in the y direction) pixels are used.

$$A_f = \begin{pmatrix} A(x,y) \\ A(x+1,y) \\ A(x+2,y) \\ \vdots \\ A(x,y+1) \\ A(x+1,y+1) \\ \vdots \\ A(x+7,y+7) \end{pmatrix} \tag{32}$$

$$W_f = \begin{pmatrix} W(-2,-2) & W(-1,-2) & \ldots & W(2,2) \\ W(-2,-2) & W(-1,-2) & \ldots & W(2,2) \\ \vdots & \vdots & \vdots & \vdots \\ W(-2,-2) & W(-1,-2) & \ldots & W(2,2) \end{pmatrix} \tag{33}$$

$$Z_f = \begin{pmatrix} Z(x-2,y-2) & Z(x-1,y-2) & \ldots & Z(x,y-2) \\ Z(x-1,y-2) & Z(x,y-2) & \ldots & Z(x+1,y-2) \\ \vdots & \vdots & \vdots & \vdots \\ Z(x+2,y+2) & Z(x+3,y+2) & \ldots & Z(x+9,y+9) \end{pmatrix} \tag{34}$$

$$A_f = W_f Z_f \tag{35}$$

where $A_f$ is the sequence vector such that two-dimensional image-captured signals are taken out for each row and arranged in a row, $W_f$ is the coefficient matrix for each pixel represented at a relative position from the target pixel, and $Z_f$ is the pixel value matrix of original image signals represented at relative positions from the target pixel.

In Expression (35), if an inverse matrix of a coefficient matrix $W_f$ can be determined, it is possible to predict an original image signal from the image-captured signal. That is, it is possible to correct the image-captured signal in which blur has occurred and to obtain an original image signal with no blur.

However, matrix expressions shown in Expressions (32) to (35) have a large number of pixels of the original image signal with respect to the number of pixels of the image-captured signal, and it is not possible to obtain an inverse matrix in a state as is. Therefore, also in the prediction of the original image signal, by introducing the above-described constraint condition expression using the nature of the neighborhood correlation of the image, the lacking order of the matrix expression is supplemented.

For the constraint condition expression using the nature of neighborhood correlation of an image, for example, a relation expression represented by Expressions (36) to (39) can be used.

$$U_1(X(x,y)-X(x,y-1))=0 \tag{36}$$

$$U_2(X(x,y)-X(x+1,y))=0 \tag{37}$$

$$U_3(X(x,y)-X(x,y+1))=0 \tag{38}$$

$$U_4(X(x,y)-X(x-1,y))=0 \tag{39}$$

These are relation expressions such that pixel values adjacent above, below, to the left, and to the right on the two-dimensional plane are equal, where the coefficients $U_1$ to $U_4$ are coefficients introduced so as to be capable of adjusting the influence of each constraint condition of Expressions (36) to (39). The values of these coefficients $U_1$ to $U_4$ are set as appropriate by, for example, the technique disclosed in Japanese Unexamined Patent Application Publication No. 2005-63097 described above.

In the manner described above, by introducing the constraint condition expressions of Expressions (36) to (39) in addition to the relation expression of Expression (35), it is possible to obtain an inverse matrix $W_f^{-1}$ of a coefficient matrix $W_f$ shown in Expression (40):

$$Z_f = W_f^{-1} A_f \tag{40}$$

In the second image processor 320 according to the present embodiment, a second output signal corresponding to the above-described original image signal is generated on the basis of the model of such an integration effect.

Figure 26:
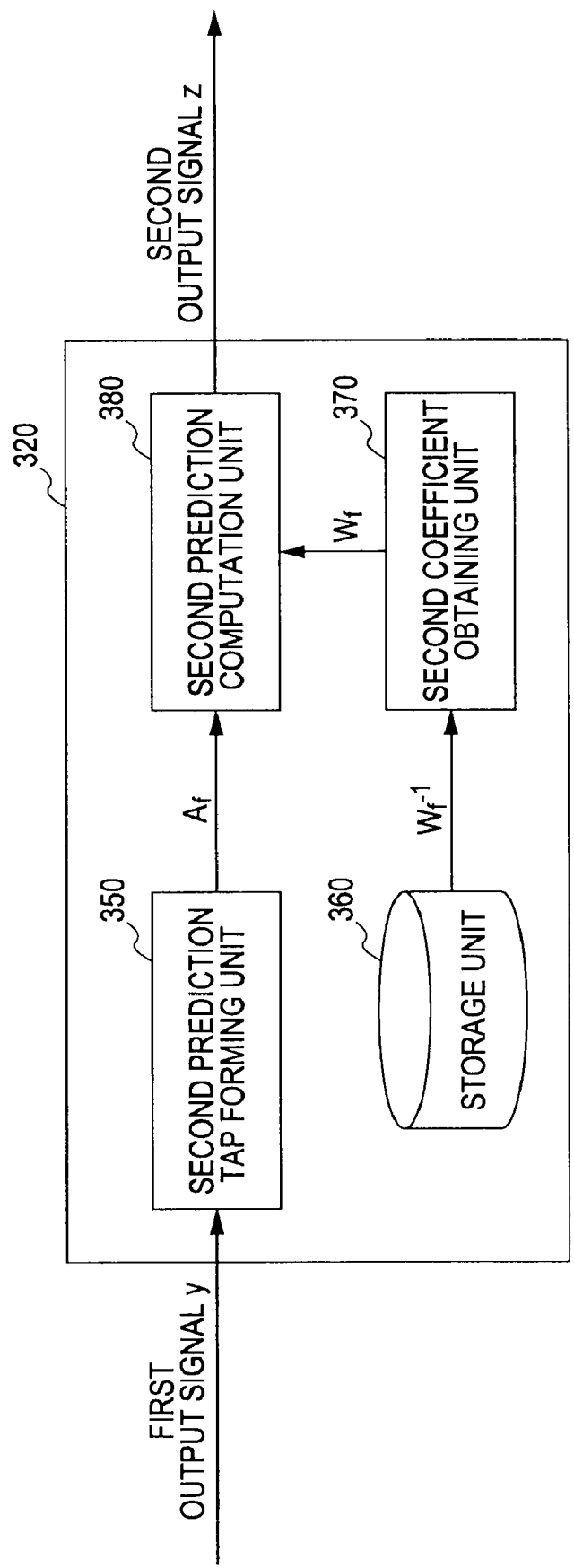
FIG. 26 is a block diagram showing the configuration of a second image processor according to the third embodiment of the present invention.

FIG. 26 is a block diagram showing the configuration of the second image processor 320. Referring to FIG. 26, the second image processor 320 includes a second prediction tap forming unit 350, a storage unit 360, a second coefficient obtaining unit 370, and a second prediction computation unit 380.

The second prediction tap forming unit 350 extracts, from the first output signal y corresponding to the image-captured signal, a plurality of pixels used to predict a target original pixel value among the original image signals, and forms a second prediction tap $A_f$.

The storage unit 360 is a storage area in which a prediction coefficient matrix $W_f^{-1}$ calculated in advance is stored. In order to predict the target original pixel value by product-sum computation with the value of the second prediction tap $A_f$, the prediction coefficient matrix $W_f^{-1}$ is calculated on the basis of the above-described model of the integration effect.

When predicting the original image signal, the second coefficient obtaining unit 370 obtains the prediction coefficient matrix $W_f^{-1}$ stored in the storage unit 360. Then, the second coefficient obtaining unit 370 extracts a row used to predict, as the second prediction coefficient $w_f$, the target original pixel value from within the prediction coefficient matrix $W_f^{-1}$, and outputs the row to the second prediction computation unit 380.

The second prediction computation unit 380 performs product-sum computation between the second prediction coefficient $w_f$ output from the second coefficient obtaining unit 370 and the value of the second prediction tap $A_f$ output from the second prediction tap forming unit 350, thereby generating and outputting a second output signal z corresponding to the original image signal.

Figure 27:
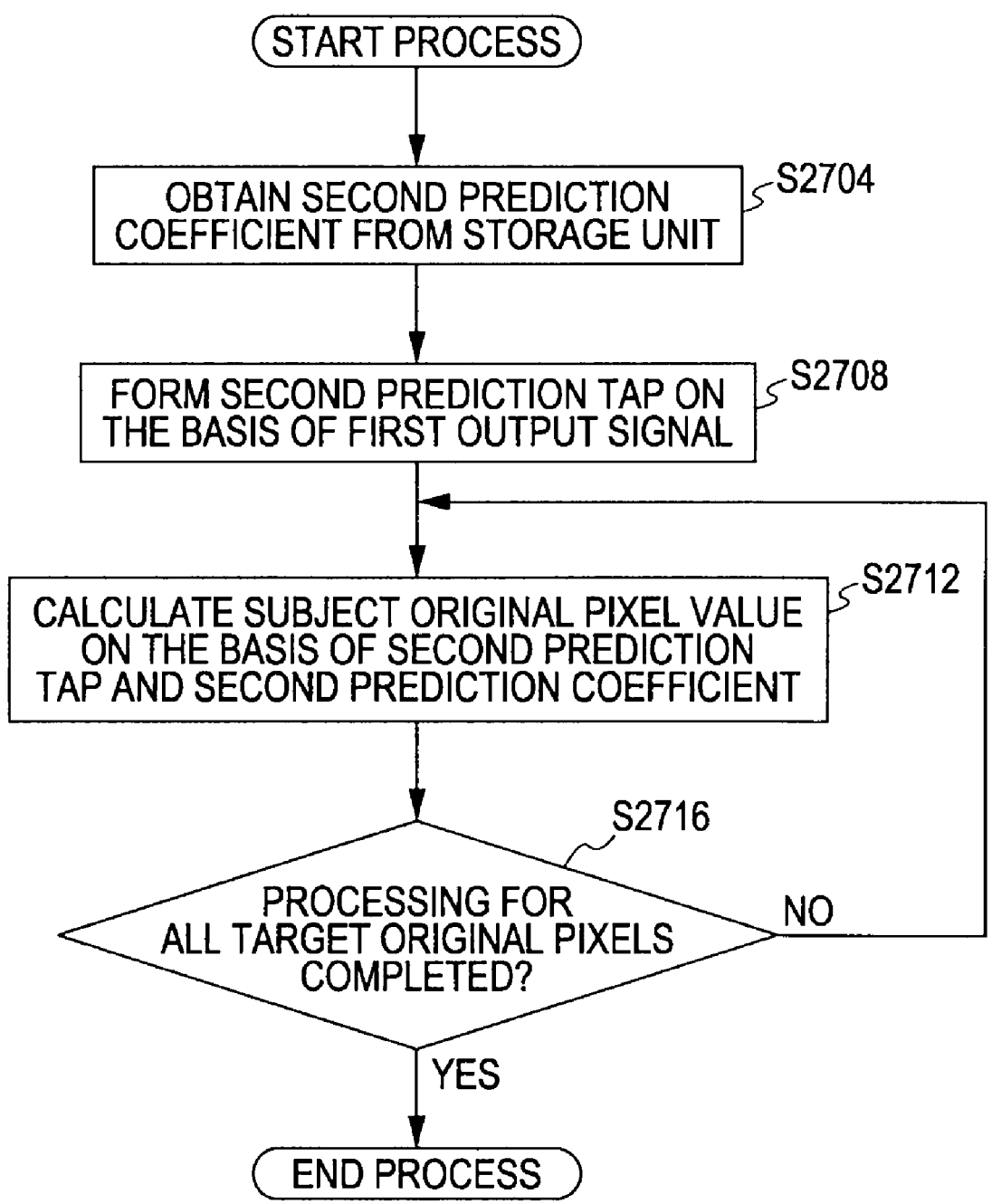
FIG. 27 is a flowchart showing the flow of a second prediction computation process according to the third embodiment of the present invention.

FIG. 27 is a flowchart showing the flow of a prediction computation process performed by the second image processor 320 according to the present embodiment.

Referring to FIG. 27, first, the coefficient obtaining unit 370 obtains a second prediction coefficient obtained from the storage unit 360 (S2704). Next, the second prediction tap forming unit 350 forms a second prediction tap from the first output signal corresponding to an image-captured signal (S2708). Then, in the second prediction computation unit 380, the target original pixel value (the pixel value of the original image signal in the target pixel) is calculated by product-sum computation between the obtained second prediction coefficient and the formed second prediction tap (S2712).

At this time, if processing for all the target original pixel values has not been completed, the process of S2712 is repeated on the next target original pixel (S2716). If processing for all the target original pixel values has been completed, the prediction computation process by the second image processor 320 according to the present embodiment is completed.

Up to this point, the image processing apparatus 300 according to the third embodiment of the present invention has been described with reference to FIGS. 22 to 27. According to the image processing apparatus 300 in accordance with the third embodiment, after a first output signal corresponding to the image-captured signal is generated from the obtained signal, furthermore, a second output signal corresponding to the original image signal is generated on the basis of the model of an integration effect. At this time, in the first image processor 120, for example, since distortion of the image, such as ringing described with reference to FIG. 3, has been removed, an error of the model of the integration effect is reduced, making it possible to improve the accuracy of a process for predicting the original image signal, which is performed by the second image processor 320.

The model of the integration effect, which can be handled by the image processing apparatus 300 according to the third embodiment, is not limited to the above-described model of blur due to an auto-focus function. For example, motion blur that occurs in a case where image-capturing is performed while the subject or the photographer is moving can also be represented using a model of an integration effect.

FIG. 28 is a schematic view showing an integration effect of motion blur. Part (A) of FIG. 28 shows a state of changes in an original image signal $Z_{it}$ input to the image-capturing unit 20 in a case where the subject is moved within the light-receiving surface represented at a pixel position i=1 to f in the time period of time t=1 to 5. The character "F" shown inside the box representing each pixel in part (A) of FIG. 28 shows that the foreground (that is, the subject) is reflected in the corresponding pixels. On the other hand, the character "B" shows that the background is reflected in the corresponding pixels.

In part (A) of FIG. 28, the subject reflected at a pixel position i=3 to 7 at time t=1 is moved in units of 1 in the positive direction (the right direction in the figure) of the pixel position each time proceeds by one, and is positioned at a pixel position i=7 to b at time t=5. At this time, when, for example, exposure is performed during time t=1 to 5 in the image-capturing unit 20, the average of the pixel values of five pixels on the time axis at the same pixel position shown in part (A) of FIG. 28 becomes the image-captured pixel value obtained as a result of the image capturing.

Part (B) of FIG. 28 shows, in a bar graph indicating the magnitude of the pixel value, each pixel value $A_i$ of the image-captured signal obtained in that manner. At this point, for the sake of convenience, it is set that the pixel value $Z_{it}$ of the original image signal of the foreground equals to F and the pixel value $Z_{it}$ of the original image signal of the background equals to 0.

Referring to part (B) of FIG. 28, at the pixel position i=7 at which the foreground is constantly reflected during the exposure time period, the pixel value $A_7$ of the image-captured signal equals to F. In comparison, in the pixel ($3 \leq i \leq 6$ and $8 \leq i \leq b$) in the surroundings of the pixel position i=7 at which the subject is moved during the exposure time period and the foreground and the background are reflected, the image-captured pixel value has a value inbetween 0 and F. Each pixel value $A_i$ of the image-captured signal in part (B) of FIG. 28 is given by the following expression:

$$A_i = \frac{1}{5}\sum_{t=1}^{5} Z_{it} \tag{41}$$

The motion blur represented by Expression (41) is one kind of a time-related integration effect that occurs during image capturing. However, as can be understood from part (A) of FIG. 28, in a situation in which motion blur has occurred, the pixel value of the original image signal at an arbitrary time when pixel values input to other pixels near the times before and after that are said to be approximately equal to each other. For example, the pixel value $Z_{75}$ of the original image signal at the pixel position i=7 at time t=5 is equal to the pixel values $Z_{64}$, $Z_{53}$, $Z_{42}$, and $Z_{31}$ at the left end portion of the moved subject. Therefore, regarding motion blur, by forming a prediction tap from a plurality of pixels of the image-captured signal and by performing product-sum computation between a predetermined prediction coefficient and the pixel value of the prediction tap, it is possible to obtain an output signal corresponding to the original image signal in which motion blur has been removed.

At this time, if a process for removing motion blur is performed on the image-captured signal predicted from the obtained signal containing distortion of the image, such as ringing involved with a filter process, an error occurs in the above-described model of motion blur, and removal effects are not obtained sufficiently. However, by applying the third embodiment of the present invention, distortion of the image involved with the filter process can be removed, and moreover, motion blur can be removed. As a consequence, it is possible to effectively remove motion blur.

Up to this point, the first to third embodiments of the present invention have been described. Each of the embodiments is an embodiment with regard to an image processing apparatus for predicting an image-captured signal or an original image signal from an obtained signal. In comparison, as described below as a fourth embodiment, an image-capturing apparatus may be formed in such a manner that each of the image processing apparatuses 100 to 300 according to the first to third embodiments is combined with image-capturing means.

Fourth Embodiment

FIG. 29 is a block diagram showing the configuration of an image-capturing apparatus 400 in which the image processing apparatus 100 according to the first embodiment is combined with image-capturing means. Referring to FIG. 29, the image-capturing apparatus 400 includes an optical low-pass filter 10, an image-capturing unit 20, an anti-aliasing filter 30, an AD converter 40, a signal integration unit 50, a parameter input unit 110, and an image processor 120.

A light signal input to the image-capturing apparatus 400 passes through the optical low-pass filter 10 so as to be formed into an original image signal, and is input to the image-capturing unit 20. The original image signal input to the image-capturing unit 20 is stored as electric charge, and is output as an image-captured signal in an analog format. The image-captured signal output from the image-capturing unit 20 is input to the anti-aliasing filter 30. In the anti-aliasing filter 30, predetermined frequency components, which cause folding noise contained in the image-captured signal to occur, are removed. The analog signal obtained after passing through the anti-aliasing filter 30 is converted into a digital signal by the AD converter 40.

In the present embodiment, the obtained signal converted into a digital signal by the AD converter 40 is input to the signal integration unit 50. In the signal integration unit 50, a header containing a characteristic parameter of a filter is attached to the obtained signal. Then, the obtained signal to which the header is attached is input to the image processor 120 and the parameter input unit 110.

The parameter input unit 110 obtains a characteristic parameter from the header of the input obtained signal and inputs the characteristic parameter to the image processor 120. As exemplified in the first embodiment, in a case where a user inputs a characteristic parameter via the parameter input unit 110, as in the present embodiment, the signal integration unit 50 for attaching a header to the obtained signal may not be provided. In that case, the obtained signal converted into a digital signal by the AD converter 40 is directly input to the image processor 120.

On the basis of the obtained signal converted into a digital signal and the characteristic parameter input from the parameter input unit 110, the image processor 120 performs the above-described prediction computation process, and outputs an output signal in which distortion of the image has been removed.

According to the fourth embodiment of the present invention, an integrated body of image-capturing means and image processing means for removing distortion of an image is provided to the user, so that the above-described effects, which are related to the removal of the distortion of the image, are widely provided to the user.

It does not matter whether a series of processes according to the first to fourth embodiments described in this specification are implemented by hardware or software. When the series of processes is to be performed by software, a program constituting the software is executed by using a computer that is incorporated in specialized hardware or, for example, a general-purpose computer shown in FIG. 30.

In FIG. 30, a CPU (Central Processing Unit) 902 controls the overall operations of the general-purpose computer. A ROM (Read Only Memory) 904 has stored therein programs in which part or the whole of a series of processes is described. In a RAM (Random Access Memory) 906, programs, data, and the like used for computation processes by the CPU 902 are temporarily stored.

The CPU 902, the ROM 904, and the RAM 906 are interconnected with one another via a bus 908. Furthermore, an input/output interface 910 is also connected to the bus 908.

The input/output interface 910 is an interface for connecting the CPU 902, the ROM 904, and the RAM 906 with an input unit 912, an output unit 914, a storage unit 916, a communication unit 918, and a drive 920.

The input unit 912 accepts instructions and information input from the user via the input device including buttons, switches, a lever, a mouse, a keyboard, and the like. The output unit 914 outputs information to the user via a display device, such as a CRT (Cathode Ray Tube), a liquid-crystal display device, or an OLED (Organic Light Emitting Diode), and/or an audio output device, such as a speaker.

The storage unit 916 is formed of, for example, a hard disk drive, a flash memory, and the like, and stores programs, program data, image data, and the like. The communication unit 918 performs a communication process via a network, such as a LAN (Local Area Network) or the Internet. The drive 920 is provided in a general-purpose computer as necessary, and, for example, a removable medium 922 is loaded into the drive 920.

When the series of processes according to the first to fourth embodiments is to be performed by software, for example, the program stored in the ROM 904, the storage unit 916, or the removable medium 922 is read into the RAM 906 at the time of execution and is executed by the CPU 902.

In the foregoing, the preferred embodiments of the present invention have been described while referring to the attached drawings. Needless to say, the present invention is not limited to such examples. It is obvious that a person skilled in the art can conceive various changes or modifications within the scope and spirit of the present invention. It should be understood that the various changes or modifications naturally fall within the technical scope of the present invention.

For example, image processing according to each of the embodiments described thus far may not be necessarily performed in accordance with the order described in the flowcharts. The processing steps in the image processing apparatus according to the first to third embodiments and in the image-capturing apparatus according to the fourth embodiment may include processes performed in parallel or independently of each other.

The present application contains target matter related to that disclosed in Japanese Priority Patent Application JP 2008-108136 filed in the Japan Patent Office on Apr. 17 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents hereof.

What is claimed is:

1. An image processing apparatus comprising:
   input means for inputting a characteristic parameter indicating the characteristics of a filter process performed on an image-captured signal that is generated by capturing light of a real world;
   detection means for detecting, on the basis of the characteristic parameter input by the input means, a phase shift amount between the image-captured signal and an obtained signal obtained as a result of a filter process performed on the image-captured signal;
   first forming means for forming a first prediction tap composed of a plurality of obtained pixels used to predict a target image-captured pixel value among the image-captured signals on the basis of the obtained signal that has been phase-shifted using the phase shift amount detected by the detection means;
   coefficient obtaining means for obtaining a first prediction coefficient generated in accordance with the characteristic parameter and the phase shift amount in order to predict the target image-captured pixel value by product-sum computation with the value of the first prediction tap; and first computation means for generating a first output signal corresponding to the image-captured signal by performing product-sum computation between the first prediction coefficient obtained by the coefficient obtaining means and the value of the first prediction tap output from the first forming means.

2. The image processing apparatus according to claim 1, further comprising:

second forming means for forming a second prediction tap composed of a plurality of image-capturing pixels used to predict a target original pixel value among the original image signals on the basis of the first output signal corresponding to the image-captured signal; and second computation means for generating a second output signal corresponding to the original image signal by performing product-sum computation between the second prediction coefficient generated on the basis of a model of an integration effect when the image-captured signal is generated and the value of the second prediction tap output from the second forming means in order to predict the target original pixel value by product-sum computation with the value of the second prediction tap, wherein the image-captured signal is a signal generated by an integration effect on the original image signal obtained from light of the real world.

3. The image processing apparatus according to claim 1 or 2, wherein the coefficient obtaining means is coefficient generation means for calculating the first prediction coefficient on the basis of a relation expression between the image-captured signal generated on the basis of the characteristic parameter and the obtained signal and on the basis of a constraint condition expression that has been generated on the basis of the nature of neighborhood correlation of an image.

4. The image processing apparatus according to any one of claims 1 to 3, wherein the input means obtains the characteristic parameter contained in a header of the obtained signal.

5. The image processing apparatus according to any one of claims 1 to 4, wherein the detection means obtains and detects the phase shift amount from a table in which the characteristic parameters and the phase shift amounts are stored in such a manner as to be associated with each other.

6. The image processing apparatus according to claim 1, wherein the coefficient obtaining means is coefficient generation means for calculating an obtained sample signal corresponding to an obtained signal for the image-captured sample signal on the basis of the image-captured sample signal that is stored in advance and the characteristic parameter, and for calculating the first prediction coefficient from an expression generated by using the image-captured sample signal and the calculated obtained sample signal.

7. The image processing apparatus according to claim 1, wherein the input means obtains the characteristic parameter in response to an operation of a user via an input device.

8. The image processing apparatus according to claim 1, wherein the detection means calculates an obtained sample signal corresponding to the obtained signal for the image-captured sample signal on the basis of the image-captured sample signal that is stored in advance and the characteristic parameter, and detects, as the phase shift amount, the number of shifted pixels corresponding to the shifted signal in which the difference with the image-captured sample signal is minimized among the plurality of shifted signals in which the obtained sample signal has been shifted by an amount corresponding to a predetermined number of pixels.

9. An image-capturing apparatus comprising:

image-capturing means for capturing light of a real world and generating an image-captured signal;

input means for inputting a characteristic parameter indicating the characteristics of a filter process performed on the image-captured signal generated by the image-capturing means;

detection means for detecting, on the basis of the characteristic parameter input by the input means, a phase shift amount between the image-captured signal and an obtained signal obtained as a result of a filter process performed on the image-captured signal;

first forming means for forming a first prediction tap composed of a plurality of obtained pixels used to predict a target image-captured pixel value among the image-captured signals on the basis of the obtained signal that has been phase-shifted using the phase shift amount detected by the detection means;

coefficient obtaining means for obtaining a first prediction coefficient generated in accordance with the characteristic parameter and the phase shift amount in order to predict the target image-captured pixel value by product-sum computation with the value of the first prediction tap; and first computation means for generating a first output signal corresponding to the image-captured signal by performing product-sum computation between the first prediction coefficient obtained by the coefficient obtaining means and the value of the first prediction tap output from the first forming means.

10. An image processing method comprising the steps of:

inputting a characteristic parameter indicating the characteristics of a filter process performed on an image-captured signal that is generated by capturing light of a real world;

detecting, on the basis of the input characteristic parameter, a phase shift amount between the image-captured signal and an obtained signal obtained as a result of a filter process performed on the image-captured signal;

forming a first prediction tap composed of a plurality of obtained pixels used to predict a target image-captured pixel value among the image-captured signals on the basis of the obtained signal that has been phase-shifted using the detected phase shift amount;

obtaining a first prediction coefficient generated in accordance with the characteristic parameter and the phase shift amount in order to predict the target image-captured pixel value by product-sum computation with the value of the first prediction tap; and generating a first output signal corresponding to the image-captured signal by performing product-sum computation between the first obtained prediction coefficient and the value of the first prediction tap.

11. A non-transitory computer readable storage medium encoded with computer program instructions that when executed by a data processor implement a method of controlling an image processing apparatus, comprising:

identifying a characteristic parameter indicating the characteristics of a filter process performed on an image-captured signal that is generated by capturing light of a real world;

detecting, on the basis of the characteristic parameter, a phase shift amount between the image-captured signal and an obtained signal obtained as a result of a filter process performed on the image-captured signal;

forming a first prediction tap composed of a plurality of obtained pixels used to predict a target image-captured pixel value among the image-captured signals on the basis of the obtained signal that has been phase-shifted using the phase shift amount detected;

obtaining a first prediction coefficient generated in accordance with the characteristic parameter and the phase shift amount in order to predict the target image-captured pixel value by product-sum computation with the value of the first prediction tap; and generating a first output signal corresponding to the image-captured signal by performing product-sum computation between the first prediction coefficient and the value of the first prediction tap.

12. An image processing apparatus comprising:

an input unit configured to input a characteristic parameter indicating the characteristics of a filter process performed on an image-captured signal that is generated by capturing light of a real world;

a detection unit configured to detect, on the basis of the characteristic parameter input by the input unit, a phase shift amount between the image-captured signal and an obtained signal obtained as a result of a filter process performed on the image-captured signal;

a first forming unit configured to form a first prediction tap composed of a plurality of obtained pixels used to predict a target image-captured pixel value among the image-captured signals on the basis of the obtained signal that has been phase-shifted using the phase shift amount detected by the detection unit;

a coefficient obtaining unit configured to obtain a first prediction coefficient generated in accordance with the characteristic parameter and the phase shift amount in order to predict the target image-captured pixel value by product-sum computation with the value of the first prediction tap; and a first computation unit configured to generate a first output signal corresponding to the image-captured signal by performing product-sum computation between the first prediction coefficient obtained by the coefficient obtaining unit and the value of the first prediction tap output from the first forming unit.

13. An image-capturing apparatus comprising:

an image-capturing unit configured to capture light of a real world and generate an image-captured signal;

an input unit configured to input a characteristic parameter indicating the characteristics of a filter process performed on the image-captured signal generated by the image-capturing unit;

a detection unit configured to detect, on the basis of the characteristic parameter input by the input unit, a phase shift amount between the image-captured signal and an obtained signal obtained as a result of a filter process performed on the image-captured signal;

a first forming unit configured to form a first prediction tap composed of a plurality of obtained pixels used to predict a target image-captured pixel value among the image-captured signals on the basis of the obtained signal that has been phase-shifted using the phase shift amount detected by the detection unit;

a coefficient obtaining unit configured to obtain a first prediction coefficient generated in accordance with the characteristic parameter and the phase shift amount in order to predict the target image-captured pixel value by product-sum computation with the value of the first prediction tap; and a first computation unit configured to generate a first output signal corresponding to the image-captured signal by performing product-sum computation between the first prediction coefficient obtained by the coefficient obtaining unit and the value of the first prediction tap output from the first forming unit.

* * * * *